US012735549B2

(12) United States Patent
Demmelmaier-Chang et al.

(10) Patent No.: US 12,735,549 B2
(45) Date of Patent: Sep. 15, 2026

(54) TANDEM ALKANE METATHESIS AND CATALYZED DEPOLYMERIZATION FOR CHEMICALLY COMPLEX CIRCULAR FEEDSTOCK

(71) Applicant: Chevron Phillips Chemical Company LP, The Woodlands, TX (US)

(72) Inventors: Cori A. Demmelmaier-Chang, Houston, TX (US); Mark L. Hlavinka, Kingwood, TX (US); Orson Sydora, Sugar Land, TX (US); Sikander Hakim, Kingwood, TX (US); Jeffery Gee, Kingwood, TX (US); Joseph Bergmeister, Spring, TX (US); Gabriela Alvez, Kingwood, TX (US); Steven S. Lim, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 918 days.

(21) Appl. No.: 18/051,725

(22) Filed: Nov. 1, 2022

(65) Prior Publication Data

US 2024/0141130 A1 May 2, 2024

(51) Int. Cl.

| | |
|---|---|
| ***C08J 11/16*** | (2006.01) |
| ***C10G 1/00*** | (2006.01) |
| ***C10G 1/10*** | (2006.01) |
| ***C10G 9/36*** | (2006.01) |

(52) U.S. Cl.

CPC ............... *C08J 11/16* (2013.01); *C10G 1/002* (2013.01); *C10G 1/10* (2013.01); *C10G 9/36* (2013.01); *C08J 2323/02* (2013.01); *C10G 2300/1003* (2013.01); *C10G 2400/20* (2013.01); *C10G 2400/30* (2013.01)

(58) Field of Classification Search

CPC ..... C08J 11/16; C10G 1/10; C10G 2300/1003
See application file for complete search history.

(56) References Cited

U.S. PATENT DOCUMENTS

| | | | |
|---|---|---|---|
| 5,079,385 | A | 1/1992 | Wu |
| 6,566,569 | B1 | 5/2003 | Chen |
| 9,802,184 | B2 | 10/2017 | Ramesh |
| 10,513,661 | B2 | 12/2019 | Narayanaswamy |
| 2014/0228606 | A1 | 8/2014 | Narayanaswamy |
| 2019/0299491 | A1 | 10/2019 | Stanislaus |
| 2021/0070958 | A1 | 3/2021 | Brita |
| 2021/0070959 | A1 | 3/2021 | Brita |
| 2021/0363432 | A1 | 11/2021 | Bitting |
| 2022/0008898 | A1 | 1/2022 | Beckham |

FOREIGN PATENT DOCUMENTS

| | | | | |
|---|---|---|---|---|
| EP | 3744814 | A1 | 12/2020 | |
| EP | 4032963 | A1 * | 7/2022 | ............... C10G 1/10 |
| WO | 2003104172 | A1 | 12/2003 | |
| WO | 2021236971 | A1 | 11/2021 | |

OTHER PUBLICATIONS

X. Jia et al., Efficient and Selective Degradation of Polyethylenes into Liquid Fuels and Waxes Under Mild Conditions, 2 Sci. Adv. E1501591(1-7) (2016).*

M. P. Gonzalez-Marcos et al., Optimization of Supports in Bifunctional Supported Pt Catalysts for Polystyrene Hydrocracking to Liquid Fuels, 64 Top. Catal. 224-242 (2021).*

L. D. Ellis et al., Tandem Heterogeneous Catalysis for Polyethylene Depolymerization via an Olefin-Intermediate Process, 9 ACS Sustainable Chem. Eng. 623-628 (2021).*

N. M. Wang et al., Chemical Recycling of Polyethylene by Tandem Catalytic Conversion to Propylene, 144 J. Am. Chem. Soc. 18526-18531 (2022).*

Basset, J.-M., Callens, E. and Riache, N. (2015). Alkane Metathesis. In Handbook of Metathesis (eds R.H. Grubbs, A. G. Wenzel, D.J. O'Leary and E. Khosravi). https://doi.org/10.1002/9783527674107.ch2.

Burnett, et al. "Mechanism and poisoning of the molecular redistribution reaction of alkanes with a dual-functional catalyst system", Journal of Catalysis, Oct. 31, 1973, p. 55-64. DOI: 10.1016/0021-9517(73)90270-4.

Conk, et.al., "Catalytic deconstruction of waste polyethylene with ethylene to form propylene", Science, Sep. 29, 2022, vol. 377, Issue 6614, pp. 1561-1566. DOI: 10.1126/science.add1088.

Costa, et.al., "H-USY and H-ZSM-5 zeolites as catalysts for HDPE conversion under a hydrogen reductive atmosphere", Sustainable Energy Fuels, 2021,5, 1134-1147. DOI:10.1039/D0SE01584A.

Ellis, et. al., "Tandem Heterogeneous Catalysis for Polyethylene Depolymerization via an Olefin-Intermediate Process", ACS Sustainable Chem. Eng. 2021, 9, 623-628, Jan. 8, 2021. DOI:10.1021/acssuschemeng.0c07612.

Liu, et.al., "Plastic waste to fuels by hydrocracking at mild conditions", Sci. Adv. 7 (17),: eabf8283, Apr. 21, 2021. DOI:10.1126/sciadv.abf8283.

Miskolczi, N, et. al. "Preparation And Application Of Metal Loaded ZSM-5 and Y-Zeolite Catalysts For Thermo-Catalytic Pyrolysis Of Real End Of Life Vehicle Plastics Waste", Journal Of The Energy Institute, 92 (1): p. 118-127, Feb. 2019. https://doi.org/10.1016/j.joei.2017.10.017.

(Continued)

*Primary Examiner* — Randy Boyer

(74) *Attorney, Agent, or Firm* — Eversheds Sutherland (US) LLP

(57) ABSTRACT

A tandem polyolefin depolymerization-metathesis process and system for converting polymer waste to smaller hydrocarbons, specifically liquid and gaseous products, which subsequently can be modified and used as feeds or co-feeds for making circular products such as circular ethylene and polyethylene. Specifically, the disclosed processes include a tandem depolymerization process step followed by a metathesis process to provide a effluent that can be separated, further processed with a subsequent depolymerization step, or both. The effluents can be supplied to downstream processing units such as a steam cracker or AROMAX® unit thereby providing an efficient method for converting polymer waste into useful circular products. Therefore, these processes and systems can expand the number of usable plastic waste streams and improve the economics of plastic waste recycling.

43 Claims, 2 Drawing Sheets

(56) References Cited

OTHER PUBLICATIONS

Santos, BPS, et. al. “Petrochemical Feedstock From Pyrolysis Of Waste Polyethylene And Polypropylene Using Different Catalysts”, Fuel, 215: p. 515-521, Mar. 1, 2018. https://doi.org/10.1016/j.fuel.2017.11.104.

Vidal, et. al. “Metathesis of Alkanes Catalyzed by Silica-Supported Transition Metal Hydrides”, Science, v 276, issue 5309, Apr. 4, 1997, pp. 99-102. DOI: 10.1126/science.276.5309.99.

Wang et.al., “Chemical Recycling of Polyethylene by Tandem Catalytic Conversion to Propylene”, J. Am. Chem. Soc. Sep. 30, 2022, https://doi.org/10.1021/jacs.2c07781.

Zhang, et al., “Polyethylene upcycling to long-chain alkylaromatics by tandem hydrogenolysis/aromatization”, Science 370, 437-441 (Oct. 23, 2020). DOI: 10.1126/science.abc5441.

International Search Report and Written Opinion issued in corresponding PCT Application No. PCT/US2023/077146, mailed on Feb. 20, 2024, 5 pp.

Gonzalez-Marcos M Pilar et al, “Optimization of Supports in Bifunctional Supported Pt Catalysts for Polystyrene Hydrocracking to Liquid Fuels”, Topics in Catalysis, vol. 64, No. 3-4, Oct. 19, 2020 (Oct. 19, 2020),—Oct. 19, 2020 (Oct. 19, 2020), pp. 224-242, XP037395015, ISSN: 1022-5528, DOI: 10.1007/SII244-020-01393-X “2.1 Catalyst Preparation” p. 225.

Jia Xiangqing et al.: “Efficient and selective degradation of polyethylenes into liquid fuels and waxes under mild conditions”, Science Advances, vol. 2, No. 6, Jun. 3, 2016 (Jun. 3, 2016), XP093121671, us ISSN: 2375-2548, DOI: 10.1126/sciadv.1501591 “Results”; p. 1; figures 1,2,3; table 1 p. 2, left-hand column, line 10-line 12.

* cited by examiner

TANDEM ALKANE METATHESIS AND CATALYZED DEPOLYMERIZATION FOR CHEMICALLY COMPLEX CIRCULAR FEEDSTOCK

CROSS REFERENCE TO RELATED APPLICATIONS

None.

TECHNICAL FIELD OF THE DISCLOSURE

This disclosure relates to the catalytic depolymerization of polyolefins and other polymers to provide hydrocarbon streams which can be used as feeds or co-feeds for the synthesis of circular chemicals and polymers.

BACKGROUND OF THE DISCLOSURE

The worldwide environmental impact associated with discarded plastic waste products is substantial, and the need to recycle plastic wastes is urgent. However, there are significant and persistent problems in conventional recycling methods for some plastics. The melts generated from mixed plastic waste include a range of plastic types that tend to separate into different phases. This phase separation results in structural weakness in the recycled product, and a significant proportion of virgin plastic must usually be blended in to impart the necessary physical properties to the product such as impact strength, tensile strength, and resistance to environmental stress cracking to name a few.

An alternative recycling method which is potentially more economically viable for mixed plastic waste is feedstock recycling using pyrolysis of these plastic waste materials. In these processes, plastic waste materials are pyrolyzed into a liquid hydrocarbon product referred to as pyrolysis oil, which can be recycled using petrochemical processing methods to produce a feedstock or co-feedstock for various processing units, including processing units which produce the monomers from which these same polymers can be produced from again. However, current pyrolysis methods produce a pyrolysis oil which includes a broad distribution of hydrocarbon molecular weights. Moreover, conventional pyrolysis reactor designs and operating conditions tend to produce an undesirably high proportion of a heavy waxy fraction, which forms solids at ambient temperatures and can require additional processing and increases costs, before the pyrolysis product is suitable as a feed or co-feed in a refinery or chemical plant.

Therefore, what is needed are new or improved processes and systems which can limit or avoid the disadvantages associated with conventional pyrolysis methods without requiring extensive sorting of the incoming plastic waste. In particular, processes and systems which could avoid traditional pyrolysis and obviate the need for refinery processes yet utilize recycled plastic feedstock to access C—C bonds as a feed or co-feed in a chemical plant to create circular chemicals and plastics would be desirable.

SUMMARY OF THE DISCLOSURE

This disclosure provides for new depolymerization processes and systems for converting plastics including plastic wastes to hydrocarbons, specifically liquid and gaseous depolymerization reactor products, which subsequently can be used in a metathesis process to form products used as feeds or co-feeds for making circular products such as circular ethylene and circular polyethylene. It has been discovered that an efficient and useful depolymerization or "catalytic pyrolysis" process can be conducted on a process feed which includes a polyolefin waste feed and a light hydrocarbon co-feed (for example, $C_6$ or lower) and which is supplied to a first heating zone. This process feed is then heated under depolymerization conditions in the presence of a depolymerization catalyst, forming a first effluent, which is then provided to a second heating zone. The second heating zone includes a metathesis catalyst, and the first effluent is heated in the presence of the metathesis catalyst under metathesis conditions, forming a second effluent.

By discovering and developing this tandem catalytic metathesis and catalytic depolymerization process, the resulting second effluent includes a lighter and more desirable feedstock (for example, $C_2$ to $C_8$) for downstream processes than delivered by a depolymerization process in the absence of a tandem metathesis process. In one aspect, the second effluent or at least a portion thereof can be supplied to a separation unit, which can be separated into a plurality of output streams, each output stream contains a circular product. In another aspect, the second effluent or at least a portion thereof can be supplied to a third heating zone and heated in the presence of another depolymerization catalyst under depolymerization conditions to form a third effluent, which itself can be separated into a plurality of output streams, each of which includes circular product. In still another aspect, a portion of the second effluent can be separated into a plurality of output streams, and a portion of the second effluent can be supplied to the third heating zone and heated in the presence of the second depolymerization catalyst forming the third effluent, which can be separated.

The effluents from the reactor heating zones can include a light fraction, for example, $C_3$ and lighter hydrocarbons, $C_4$ and lighter hydrocarbons, or $C_5$ and lighter hydrocarbons. In an aspect, for example, the first effluent can include a light fraction which can be removed from the first heating zone, or after the first heating zone ahead of the metathesis reactor. In another aspect, the second effluent can include a light fraction which is removed from the second heating zone, that is, from the metathesis reactor.

The output streams from the separation steps can include, for example, $C_2$-$C_5$ hydrocarbons, $C_6$-$C_8$ hydrocarbons, or $C_9$+ hydrocarbons. In an aspect, $C_2$-$C_5$ saturated and unsaturated hydrocarbons can be provided to a steam cracker to produce circular ethylene and/or circular propylene. The $C_6$-$C_8$ hydrocarbons can be provided to, for example, a reforming unit or an AROMAX® unit or provided to a steam cracker to produce circular ethylene and/or circular propylene. In an aspect, the $C_{9+}$ heavies product can be recycled to the first depolymerization reactor.

In aspects, the first depolymerization catalyst and the second depolymerization catalyst, independently, can be a zeolite-based catalyst such as a Pt/zeolite catalyst, and the zeolite can be any zeolite such as L-zeolite or ZSM-5 (MFI) zeolite. The zeolite-based catalysts are utilized for their dehydrogenation, hydrogenolysis, cracking, and isomerization functions to depolymerize the polyolefin in the process feed. The process can be optimized or adjusted toward the production of selected products for producing circular chemical and polymer products downstream. For example, using a Pt/zeolite catalyst according to this disclosure can optimized to favor $C_2$-$C_8$ products to be fed to the metathesis reactor.

According to another aspect, the metathesis catalyst can comprise any metathesis catalyst that is recognized as an olefin metathesis catalyst, an alkane metathesis catalyst, or it can comprise a combination thereof. For example, in an aspect, the metathesis catalyst can comprise a metal oxide-based metathesis catalyst, a metal halide-based metathesis catalyst, or any combination thereof, such as cobalt oxide, molybdenum oxide, tungsten oxide, rhenium oxide. In another aspect, the metathesis catalyst can comprise a supported metal hydride, alkyl, alkylidene, or alkylidyne of an transition metal such as tantalum, molybdenum, or tungsten. In an aspect, these metathesis catalysts can be supported on alumina, silica, silica-alumina, silica-coated alumina, and other supports.

In the disclosed process, a chemically-modified solid oxide comprising a solid oxide treated with an electron-withdrawing anion can be used in a variety of ways to enhance the conversion of the plastic waste. These chemically-modified solid oxide materials which comprise a solid oxide treated with an electron-withdrawing anion may be referred to herein as a solid super-acid, or "SSA", and their high acidity can be used to augment the depolymerization process. For example, the polyolefin waste feed or the process feed can be contacted with an SSA in the first heating zone or in a pre-heating zone, in the presence or the absence of the light hydrocarbon co-feed. In another aspect, an independently selected SSA can be used to contact the polyolefin waste feed, the process feed, the first effluent, the second effluent, or combinations thereof.

Accordingly, in an aspect, this disclosure provides a process for converting plastic waste, in which the process can comprise:

(a) providing a process feed comprising a polyolefin waste feed and a light hydrocarbon co-feed to a first heating zone;

(b) heating the process feed in the presence of a first depolymerization catalyst under depolymerization conditions to form a first effluent;

(c) providing the first effluent to a second heating zone;

(d) heating the first effluent in the presence of a metathesis catalyst under metathesis conditions to form a second effluent; and (e)(1) separating at least a portion of the second effluent into a plurality of output streams, each output stream comprising a circular product, (2)(A) providing at least a portion of the second effluent to a third heating zone and heating the second product feed in the presence of a second depolymerization catalyst under depolymerization conditions to form a third effluent, and (B) separating the third effluent into a plurality of output streams, each output stream comprising a circular product, or (3) conducting steps (e)(1), (e)(2)(A), and (e)(2)(B).

Therefore, according to this aspect, step (e)(1) can be conducted, steps (e)(2)(A) and (e)(2)(B) can be conducted, or all of steps (e)(1), (e)(2)(A), and (e)(2)(B) can be conducted.

In another aspect, this disclosure provides a system for converting plastic waste, in which the system can comprise:

(a) a first heating zone configured to receive a process feed through a first feed inlet, heat the process feed in the presence of a first depolymerization catalyst, and discharge a first effluent through at least one first product outlet;

(b) a second heating zone configured to receive at least a portion of the first effluent through a second feed inlet, heat the first effluent in the presence of a metathesis catalyst, and discharge a second effluent through at least one second product outlet;

(c) an optional third heating zone configured to receive the second effluent through a third feed inlet, heat the second effluent in the presence of a second depolymerization catalyst, and discharge a third effluent through at least one third product outlet; and (d) a separation unit, configured to receive and separate the second effluent or the third effluent into a plurality of output streams, each output stream comprising a circular product.

This system includes aspects in which the third heating zone is present and those in which the third heating zone is absent.

These and other embodiments and aspects of the processes, methods, and compositions including catalyst compositions are described more fully in the Detailed Description and claims and further disclosure such as the Examples provided herein.

DETAILED DESCRIPTION OF THE DISCLOSURE

Figure 1:
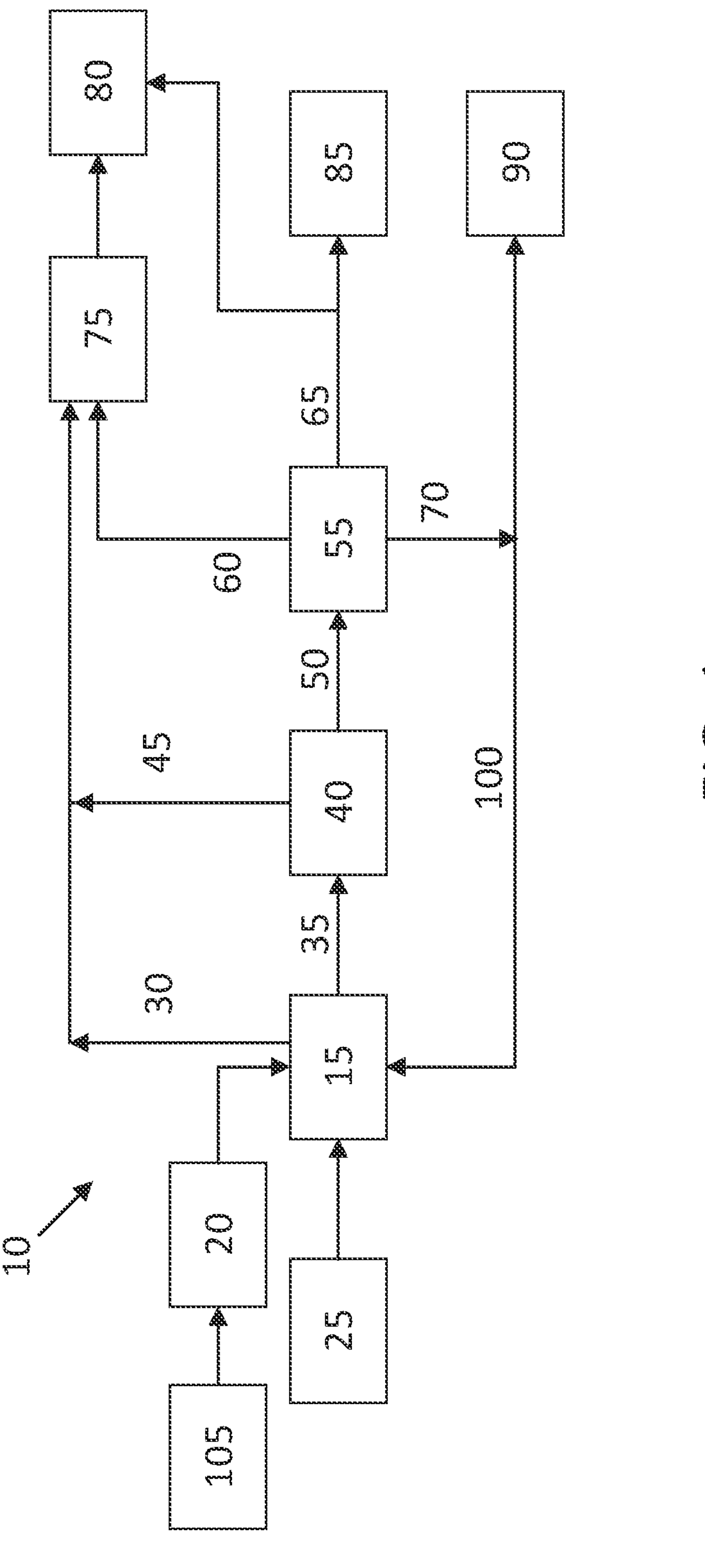
FIG. 1 illustrates an embodiment of the disclosure showing an example of a tandem depolymerization-metathesis process for converting plastic waste and producing of circular products, in which the second effluent or a portion thereof is delivered directly to a separation unit without first being provided to a third heating zone and therefore, in the absence of contacting a second depolymerization catalyst.

This disclosure provides depolymerization or "catalytic pyrolysis" processes and systems for converting polymer waste to smaller hydrocarbons, specifically liquid and gaseous depolymerization reactor products, which subsequently can be modified and used as feeds or co-feeds for making circular products like circular ethylene and polyethylene. Specifically, the disclosed processes include a tandem depolymerization-metathesis, that is, a depolymerization process step followed by a metathesis process step to provide a effluent that can be separated, further processed with a subsequent depolymerization step, or both. In any case, the effluents of the process can be supplied to downstream processing units such as a steam cracker or AROMAX® unit, or recycled to the depolymerization reactor, thereby providing an efficient method for converting polymer waste into useful circular products. Therefore, these processes and systems can expand the number of usable plastic waste streams and improve the economics of plastic waste recycling.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

Groups of elements of the periodic table are indicated using the numbering scheme indicated in the version of the periodic table of elements published in Chemical and Engineering News, 63(5), 27, 1985. In some instances, a group of elements may be indicated using a common name assigned to the group; for example alkali metals for Group 1 elements, alkaline earth metals for Group 2 elements, transition metals for Group 3-12 elements, and halogens or halides for Group 17 elements.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a process, system, or composition as "consisting essentially of" is not to be construed as "comprising," but is intended to describe the recited component that includes materials which do not significantly alter or do not materially affect the basic and novel characteristic(s) of process, system or composition to which the term is applied. For example, a feedstock consisting essentially of a material A can include impurities typically present in a commercially produced or commercially available sample of the recited material A.

When a claim includes different features and/or feature classes (for example, process steps, feedstock features, and/or product features, among other possibilities), the transitional terms comprising, consisting essentially of, and consisting of, apply only to feature class to which is utilized and it is possible to have different transitional terms or phrases utilized with different features within a claim. For example, a method can comprise several recited steps (and other non-recited steps) but utilize a catalyst composition preparation consisting of specific steps but utilize a catalyst composition comprising recited components and other non-recited components. While compositions and methods are described in terms of "comprising" various components or steps, the compositions and methods can also "consist essentially of" or "consist of" the various components or steps, unless stated otherwise.

The terms "a," "an," and "the" are intended, unless specifically indicated otherwise, to include plural alternatives, e.g., at least one. For instance, the disclosure of "a heating zone" or a "heater" is meant to encompass one heating zone (or heater) or more than one heating zone (or heater) unless otherwise specified.

The terms "configured for use" or "adapted for use" and similar language is used herein to reflect that the particular recited structure or procedure is used in depolymerization (catalytic pyrolysis) system or process, or in a system or process downstream thereof such as an olefin polymerization system or process. For example, unless otherwise specified, a particular structure "configured for use" means it is "configured for use in a depolymerization reactor system" and therefore is designed, shaped, arranged, constructed, and/or tailored to effect depolymerization, as would have been understood by the skilled person.

For any particular compound disclosed herein, a general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise or unless the context provides or requires otherwise. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicant states that one or more steps in the processes disclosed herein can be conducted at a temperature in a range from 10° C. to 75° C., this range should be interpreted as encompassing temperatures in a range from "about" 10° C. to "about" 75° C.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual process steps, reactor elements, chemical substituents, analogs, compounds, ligands, structures, or groups thereof, or any members of a claimed group, if for any reason Applicant chooses to claim less than the full measure of the disclosure.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In embodiments, use of the term "about" can mean±15% of the stated value, ±10% of the stated value, ±5% of the stated value, ±3% of the stated value, ±2% of the stated value, or ±1% of the stated value.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

The term "polymer" is used herein generically to include homopolymers, copolymers, terpolymers, and so forth, such as olefin homopolymers, copolymers, terpolymers, and the like. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin polymer (polyolefin), such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer or a poly(ethylene-co-1-hexene) polymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The terms "light", "medium" and "heavy", unless defined otherwise or unless the context requires otherwise, are relative terms and are used herein to refer to the components of a process feed or process feed, a reactor effluent, a product from a separation system such as a condenser system, and the like. The "light", "medium" and "heavy" feeds, effluents, or products may constitute separate or combined feed streams, effluent streams, or products, as understood by the person of ordinary skill in the art according to the context in which these terms are used. For example, a depolymerization reactor effluent may include a gaseous effluent and a liquid effluent which may be referred to as simply "light" and "heavy", and products from a separation unit may include combinations of "light", "medium" and "heavy" products. Thus, depending upon the reactor and process conditions, the depolymerization reactor effluent can include: a light fraction and a heavy fraction; or a light fraction, one or more medium fractions, and a heavy fraction; and the like. Referring to portions of the depolymerization reactor effluent as light, medium, heavy, gaseous, or liquid are relative terms, and the carbon count or weight of the hydrocarbons constituting each fraction can depend upon factors such as the reactor conditions such as temperature and pressure and the type, the design, and the efficiency of the separation system. These descriptions of light, medium, and heavy components are approximate, and the light fraction may include some components found in the medium or heavy fraction, the medium fraction may include some components found in the light or heavy fraction, and the heavy fraction may include some components found in the light or medium fraction. As described further herein, if necessary for the definiteness of a claim or for other reasons, the "light fraction" can comprise primarily $C_2$-$C_5$ hydrocarbons, the "medium fraction" can comprise primarily $C_6$-$C_8$ hydrocarbons, and the "heavy fraction" can comprise primarily $C_{9+}$ hydrocarbons, unless otherwise provided. Moreover, the general terms "light", "medium", and "heavy" when referring to hydrocarbons, can be used to refer to compositions which comprise primarily $C_2$-$C_5$ hydrocarbons (light), primarily $C_6$-$C_8$ hydrocarbons (medium), and primarily $C_{9+}$ hydrocarbons (heavy). In a similar fashion, terms such as "light fraction gas", "light fraction liquid", and the like are relative terms, and the weight of the hydrocarbons constituting each portion can depend upon various factors such as the type, the design, and the efficiency of a separation unit.

The term "metathesis" as used in describing a metathesis catalyst or metathesis process, unless otherwise indicated, is non-limiting and is intended to include alkene (olefin) metathesis, alkane metathesis, or a combination thereof, regardless of any specific mechanisms by which the process may occur. For example, in an aspect, the metathesis can include an alkene metathesis in which alkylidene moieties of alkenes are redistributed. In another aspect, the metathesis can include an alkane metathesis in which alkanes can undergo dehydrogenation to form olefins, olefin metathesis, and hydrogenation back to alkanes. These steps can occur over the same catalyst in the same reactor. These catalysts may be grouped together and referred to as simply metathesis catalysts, alkane metathesis catalysts, or alkene (olefin) metathesis catalysts. Useful catalysts include those associated with olefin metathesis such as $MoO_3/Al_2O_3$ or $WO_3/SiO_2$, those "trifunctional" catalysts such as supported zirconium or tantalum polyhydrides associated with alkane metathesis by alkane dehydrogenation, olefin metathesis, and alkene hydrogenation, and those combination catalysts that separate the (de)hydrogenation and olefin metathesis functions such as iridium-based (de)hydrogenation catalyst in combination with a molybdenum or tungsten olefin metathesis catalyst. See for example, Handbook of Metathesis; Ed. R. H. Grubbs, A. G. Wenzel, D. J. O'Leary, and E. Khosravi; vol. 1-3; c. 2015; Wiley-VCH Verlag GmbH & Co. KGaA.

The terms "halogen" and "halide" are used interchangeably in this disclosure, unless stated otherwise or unless the context requires otherwise, to refer to fluorine, chlorine, bromine, and iodine, regardless of whether these elements are in neutral or anionic form or occur as molecular or polymeric substituents or atoms in a solid-state structure. These terms are often used in the context of a halide or halogen contaminant that may occur in the polyolefin waste feed or the light hydrocarbon co-feed, in which these terms are used interchangeably.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Tandem Depolymerization and Metathesis Process

An aspect of this disclosure utilizes a depolymerization or "catalytic pyrolysis" process for converting polymer waste to smaller hydrocarbons, specifically liquid and gaseous depolymerization reactor products, which subsequently can be fed to a metathesis reactor for conversion to products which can be used as feeds or co-feeds for making circular products. One aspect of this disclosure provides a process for converting plastic waste, in which the process can comprise:

(a) providing a process feed comprising a polyolefin waste feed and a light hydrocarbon co-feed to a first heating zone;
(b) heating the process feed in the presence of a first depolymerization catalyst under depolymerization conditions to form a first effluent;
(c) providing the first effluent to a second heating zone;
(d) heating the first effluent in the presence of a metathesis catalyst under metathesis conditions to form a second effluent; and
(e)(1) separating at least a portion of the second effluent into a plurality of output streams, each output stream comprising a circular product,
(2)(A) providing at least a portion of the second effluent to a third heating zone and heating the second product feed in the presence of a second depolymerization catalyst under depolymerization conditions to form a third effluent, and (B) separating the third effluent into a plurality of output streams, each output stream comprising a circular product, or
(3) conducting steps (e)(1), (e)(2)(A), and (e)(2)(B).

Therefore, step (e)(1) can be conducted, steps (e)(2)(A) and (e)(2)(B) can be conducted, or all of steps (e)(1), (e)(2)(A), and (e)(2)(B) can be conducted.

In some aspects, the first heating zone and the second heating zone can occur in a single reactor, or the first heating zone and the second heating zone can occur in separate reactors in series. In other aspects, the first heating zone, the second heating zone, and the third heating zone can occur in a single reactor, or the first heating zone, the second heating zone, and the third heating zone can occur in separate reactors in series. When the first, second, and third heating zones occur in different reactors, the first heating zone can be referred as the first depolymerization reactor (or simply the depolymerization reactor when the third heating zone is absent), the second heating zone can be referred to as the metathesis reactor, and the third heating zone can be referred to as the second depolymerization reactor.

In an aspect, the polyolefin waste feed can be and typically is a solid at 25° C., and the process feed provided to the first heating zone can be a liquid, for example by preheating the process feed or by dissolution of the polyolefin waste feed in the light hydrocarbon co-feed. When the process feed is heated with a first depolymerization catalyst under depolymerization conditions to form a first effluent, subsequent processing of the first effluent can comprise providing some or all of the first effluent to a second heating zone where it is heated in the presence of a metathesis catalyst.

In embodiments, the polyolefin waste feed, the light hydrocarbon co-feed, or both the polyolefin waste feed and the light hydrocarbon co-feed, can be pre-heated prior to being provided to the first heating zone. For example, the polyolefin waste feed can be preheated in a pre-heating zone prior to being provided to the first heating zone, and in one aspect, the polyolefin waste feed can be preheated in a pre-heating zone comprising an extruder prior to being provided to the first heating zone. In another aspect, the polyolefin waste feed can be preheated in a pre-heating zone in the presence of the first depolymerization catalyst prior to being provided to the first heating zone. In some embodiments, the polyolefin waste feed and the light hydrocarbon co-feed can be combined to form the process feed before, during, or after being provided the process feed to the first heating zone.

The first effluent may comprise HCl that derived from chlorinated waste plastics in the process feed. When, the first effluent contains HCl in a certain concentration, the first effluent can be treated to reduce the concentration of the HCl prior to providing the first effluent to a second heating zone.

In an aspect of the disclosed process, the first heating zone, the second heating zone, and if applicable, the third heating zone, or any combination thereof can comprise a fluidized bed reactor. In another aspect, the first heating zone, the second heating zone, and if applicable, the third heating zone, or any combination thereof can comprise a fixed bed reactor.

According to an aspect, this process includes the option of (e)(2)(A) providing at least a portion of the second effluent to a third heating zone and heating the second product feed in the presence of a second depolymerization catalyst under depolymerization conditions to form a third effluent, and (2)(B) separating the third effluent into a plurality of output streams. In an aspect, the first depolymerization catalyst employed in the initial depolymerization step can be the same as the second depolymerization catalyst. In another aspect, the first depolymerization catalyst can be different from the second depolymerization catalyst.

The process for depolymerizing polymers such as polyethylene can use a zeolite-based catalyst such as a Pt/zeolite catalyst, in which the zeolite can comprise any zeolite such as L-zeolite or ZSM-5. Promoters can be used in combination with these catalysts, such as tin or optionally a solid super-acid or "SSA" (for example, sulfated alumina) for acidity. Zeolite pore volume and zeolite pore diameter of the zeolite or of the zeolite-based catalyst itself can be used to adjust or optimize the process for the desired hydrocarbon distribution and catalyst acidity, for example, to produce a maximum amount of the desired feedstock such as a $C_2$-$C_8$ feedstock. The depolymerization process can be conducted in a fluidized or fixed bed depolymerization (catalyzed pyrolysis) reactor.

The first effluent, the second effluent, the third effluent, or any combination thereof can comprise a gaseous product and a liquid product. The first effluent, the second effluent, or the third effluent can comprises olefins, alkanes, or a combination thereof. In one aspect, a portion of the first effluent, in particular a light fraction of the first effluent, can be removed from the first heating zone. In an aspect, the light fraction can comprise $C_3$ and lighter hydrocarbons, $C_4$ and lighter hydrocarbons, or $C_5$ and lighter hydrocarbons. For example, a $C_2$-$C_5$ fraction of the first effluent can be removed from the first heating zone or removed from the first effluent ahead of the second heating zone, and can be fed to a steam cracker. The more heavy fraction of the first effluent can then be fed to the second heating zone for contact with the metathesis catalyst. In another aspect, the second effluent can comprise a light fraction which can be removed from the second heating zone.

The first heating zone is not limited to any specific type of heating unit, for example, the first heating zone can comprise an extruder. The polyolefin waste feed is heated in the first heating zone and partially or completely melted. In aspects, combining a light hydrocarbon co-feed with the polyolefin waste feed can occur before, during, or after providing the polyolefin waste feed to the first heating zone, or before, during, or after heating the polyolefin waste feed, or any combination thereof. Thus, the light hydrocarbon co-feed can be combined with polyolefin waste feed prior to feeding to the first heating zone, while the polyolefin waste feed is being heated, or after the polyolefin waste feed has been heated and partially or completely melted. This process can also further include the step of introducing an additional polyolefin waste feed, additional light hydrocarbon co-feed, or both additional polyolefin waste feed and additional light hydrocarbon co-feed into the first depolymerization reactor if desired.

According to another aspect, the process for converting plastic waste can further comprise combining the zeolite-based catalyst with the polyolefin waste feed in the first heating zone. In a further aspect, the process can further comprise combining the zeolite-based catalyst with the process feed before or after providing the process feed to the first depolymerization reactor.

In one aspect, this process can further comprise recycling one or more of the output streams such as a heavy fraction, upstream to the first depolymerization reactor. In this way, further depolymerization or deoligomerization can occur to provide the desired product distribution.

In this process for converting plastic waste, the polyolefin waste feed can contain polyolefin waste, and the amount or the fraction of the circular product attributable to the polyolefin waste or any additional plastic waste in one or more output streams can be determined by mass balance. In one aspect, the process for converting plastic waste can further comprise certifying the circular product attributable to the polyolefin waste or the additional plastic waste in one or more output streams as Circular in accordance with International Sustainability and Carbon Certification (ISCC) standards, based upon the amount or the fraction of the circular product attributable to the polyolefin waste or the additional plastic waste in one or more output streams determined by mass balance and the free attribution method. In this aspect, these calculations to account for plastic waste can consider the polyolefin waste in the polyolefin waste feed and any polyolefin waste or other polymer wastes in the light hydrocarbon co-feed.

Polyolefin Waste Feed

In this process for converting plastic waste, the polyolefin waste feed can comprise a polyethylene, a polypropylene, a polystyrene, other polyolefins, or any combination thereof. Therefore, in an aspect, the polyolefin waste feed is a solid at 25° C. While the polyolefin waste feed can include a high proportion of polyolefin waste materials, the polyolefin waste feed may also include other types of "waste plastic" or "plastic waste" which are different from the polyolefin waste. Therefore, the process feed can also comprise additional plastic waste which is different from the polyolefin waste.

In aspects, the polyolefin waste feed can include waste plastics such as polyesters, polyamides, polyurethanes, polyphenols, polycarbonates, polyvinyl chlorides, or any combinations thereof. Therefore, in another aspect, the waste plastics which can be used in the polyolefin waste feed also can be a solid at 25° C. In another, the waste plastic can include polyethylene terephthalate (PET) or polyvinyl chloride (PVC), which are prevalent in waste plastics. When the waste plastic comprises polyvinyl chloride (PVC), the polyvinyl chloride (PVC) can be present in the polyolefin waste feed in a concentration of less than 10 wt. %, less than 5 wt. %, less than 2 wt. %, less than 1 wt. %, or less than 0.5 wt. %.

In this aspect, the polyolefin waste feed can be present in the process feed, that is, in the combination of polyolefin waste feed and the light hydrocarbon co-feed, in a concentration from greater than 0 wt. % or from about 15 wt. %, and up to 40 wt. %, 50 wt. %, 60 wt. %, 70 wt. %, or 80 wt. %. For example, the polyolefin waste can be present in the process feed in a concentration of from about 10 wt. % to about 80 wt. %, from about 15 wt. % to about 70 wt. %, or from about 20 wt. % to about 60 wt. %. These concentrations refer to those polymers traditionally recognized as polyolefins rather than halogenated polyolefins, therefore these concentrations would not include any polyvinyl chloride or polytetrafluoroethylene present in the feed. The polyolefin waste feed also may be present in the process feed in a concentration of about 5 wt. %, about 10 wt. %, about 20 wt. %, about 30 wt. %, about 40 wt. %, about 50 wt. %, about 60 wt. %, about 70 wt. %, about 80 wt. %, or any range between any of these weight percentages.

The polyolefin waste feed can be fed to the first heating zone as a solid having an average size range which is beneficial for handling and feeding the solid or slurry of the polyolefin in the light hydrocarbon co-feed and beneficial to melting the solid polyolefin waste feed to form the liquid process feed. In this aspect, the polyolefin waste feed, the additional plastic waste feed, or both the polyolefin waste feed and the additional plastic waste feed are a solid characterized by an average particle size of less than 2 mm, less than 5 mm, from 1 mm to 5 mm, from 5 mm to 10 mm, or from 10 mm to 20 mm. In aspects, the polyolefin waste feed, the additional plastic waste feed, or both the polyolefin waste feed and the additional plastic waste feed are a solid characterized by an average particle size of less than 10 mm or less than 20 mm.

Polyolefins that make up the polyolefin waste feed can contain a catalyst residual from the catalytic polymerization process used to make the polyolefin. In an aspect, the polyolefin waste feed can comprise a catalyst residual in the polyolefin waste comprising a transition metal oxide, a main group metal oxide, or a combination thereof. For example, the polyolefin waste feed comprises a catalyst residual in the polyolefin waste comprising an oxide of a Group 4 metal, a Group 5 metal, a Group 6 metal, a Group 7 metal, or any combination thereof. The polyolefin waste feed can comprises a catalyst residual in the polyolefin waste comprising an oxide of Ti, Zr, Hf, Cr, or any combination thereof. Support materials from polymerization catalysts may be found in the polyolefin waste. For example, the polyolefin waste feed can comprise a catalyst residual in the polyolefin waste that includes silica, alumina, silica-alumina, magnesium oxide, or any combination thereof. In an aspect, the polyolefin waste feed can also comprise a catalyst residual in the polyolefin waste of a chemically-modified solid oxide comprising a solid oxide treated with an electron-withdrawing anion.

Light Hydrocarbon Co-Feed

In aspects, the process feed to the first depolymerization reactor can comprise a polyolefin waste feed and a light hydrocarbon co-feed, and the light hydrocarbon co-feed is not limited to any particular hydrocarbon. For example, the light hydrocarbon co-feed can comprise a pyrolysis gas or liquid, a pyrolysis oil fraction, a petroleum-based co-feed, a fossil fuel-based co-feed, or a bio-based co-feed, or any combination thereof. The light hydrocarbon co-feed can comprise a light ($C_2$-$C_5$) hydrocarbon, a light ($C_6$ or lower)

pyrolysis liquid, a $C_5$-$C_6$ saturated hydrocarbon, natural gas liquids (NGL), light naphtha, or any combination thereof.

When the light hydrocarbon co-feed comprises a product which is derived from waste plastic such as a pyrolysis gas or liquid or a pyrolysis oil fraction, the determination of the fraction of any circular product derived from the process can account for recycled mass from the polyolefin waste and from the waste product portion of the light hydrocarbon co-feed such as a pyrolysis oil fraction.

In an aspect, when the light hydrocarbon co-feed includes a pyrolysis product, the light hydrocarbon co-feed can comprise a pyrolysis gas or a light pyrolysis liquid or any pyrolysis oil fraction derived from pyrolysis of a range of different waste polymers, such as polyethylene, polypropylene, polystyrene, polyethylene terephthalate (PET), polyvinyl chloride (PVC), polyamide, polycarbonate, polyurethane, polyester, copolymers thereof, filled polymers thereof, composites thereof, natural or synthetic rubber, tires, or any combination thereof.

Depolymerization Catalysts

In the disclosed process for converting plastic wastes, the process feed is contacted with a first depolymerization catalyst in a first heating zone, also referred to as a depolymerization reactor, under depolymerization conditions, to form a first effluent. In this aspect, the first depolymerization catalyst can comprise a zeolite-based catalyst, a chromia-based catalyst, or a combination thereof. The first depolymerization catalyst can achieve depolymerization of the polyolefin waste feed, but the catalyst may also carry out additional reactions. For example, the first depolymerization catalyst may achieve dehydrogenation, hydrogenolysis, cracking, isomerization, dehydrohalogenation, dehalogenation, or a combination thereof, of the process feed.

The disclosed process can employ a first depolymerization catalyst to depolymerize the polyolefin waste of the process feed, and can further employ a second depolymerization catalyst to react with at least a portion of the second effluent discharged from the metathesis step in the second heating zone. The first depolymerization catalyst and the second depolymerization catalyst are selected independently, and descriptions of any depolymerization catalyst herein are applicable to the first depolymerization catalyst and the second depolymerization catalyst independently. Therefore, the first depolymerization catalyst and the second depolymerization catalyst can be the same, or the first depolymerization catalyst and the second depolymerization catalysts can be different.

In one aspect, the first depolymerization catalyst and the second depolymerization catalyst, independently, can comprise a zeolite-based catalyst. The zeolite-based catalyst can comprise any zeolite. For example, in aspects, the zeolite-based catalyst can comprise L-Zeolite (Zeolite L or LTL), X-Zeolite (Zeolite X), Y-Zeolite (Zeolite Y), omega Zeolite, beta Zeolite, SAPO-34 Zeolite, USY Zeolite, HY Zeolite, ZSM-4, ZSM-5 (MFI), ZSM-10, ZSM-11, ZSM-12, ZSM-20, ZSM-22, ZSM-23, ZSM-34, ZSM-35, ZSM-50, REY, USY, RE-USY, LZ-210, LZ-210-A, LZ-210-M, LZ-210-T, SSZ-13, SSZ-24, SSZ-26, SSZ-31, SSZ-33, SSZ-35, SSZ-37, SSZ-41, SSZ-42, SSZ-44, MCM-58, H-MOR (H-mordenite), mazzite, faujasite, chabazite, and the like, a modified mesoporous form thereof, or any combination thereof. In an aspect, the zeolite of the zeolite-based catalyst can include unbound or bound zeolites in which the zeolite can have an effective pore diameter of about 7 angstroms or larger.

The zeolite-based catalyst can comprise any zeolite and can further comprise a binder for the zeolite. The zeolite binder can comprise, can consist essentially of, or can be any inorganic oxide, including but not limited to silica, alumina, clays, titania, magnesium oxide, and combinations thereof. In an aspect, the zeolite-based catalyst with a silica binder can be prepared from a silica sol. In another aspect, the zeolite-based catalyst with an alumina binder can be prepare from a solution. The resulting pastes from these mixtures can be fired to make the bound zeolite-based catalysts. In one aspect, the zeolite-based catalyst can include the zeolite or combination of zeolites and any amount of binder that can provide the zeolite-based catalyst in a suitable solid structure after processing. For example, the zeolite-based catalyst can include the zeolite or combinations of zeolites and from about 15 wt % to about 35 wt % binder, alternatively from about 20 wt % to about 30 wt % binder, or alternatively any weight percentage between these values.

In another aspect, associated with the zeolites are certain transition metals to affect the catalytic depolymerization. For example, the zeolite-based catalyst can comprise chromium, molybdenum, tungsten, iron, ruthenium, osmium, cobalt, rhodium, iridium, nickel, palladium, platinum, zinc, magnesium, gallium, titanium, tantalum, or any combination thereof. In one aspect, the zeolite-based catalyst can comprise one or more of the platinum metals. In another aspect, the zeolite-based catalyst comprises rhodium, iridium, palladium, platinum, ruthenium, osmium, or a combination thereof. In embodiments, the zeolite-based catalyst can comprise or can be selected from Pt-L-Zeolite, Pt-ZSM-5, Pt-Y zeolite, Pt-SAPO-34 zeolite, Pt-USY zeolite, Pt-HY zeolite, Pt-beta zeolite, or any combination thereof.

In other embodiments, the zeolite-based catalyst can comprise fluorine, chlorine, bromine, iodine, or any combination thereof. In an aspect, the transition metal-zeolite catalysts such as Pt-L-Zeolite, Pt-ZSM-5, Pt-Y zeolite, Pt-SAPO-34 zeolite, Pt-USY zeolite, Pt-HY zeolite, and Pt-beta zeolite, can include halide content, such as chloride or fluoride content, which can be beneficial to the activity and longevity of the zeolite-based catalysts. Both fluoride concentrations and chloride concentrations can enhance the performance of the zeolite-based catalyst. In an aspect, for example, the chloride concentration in the zeolite-based catalyst can be from about 0.1 wt. % to about 4.0 wt. % or from about 0.5 wt. % to about 3.5 wt. %. In another aspect, the fluoride concentration in the zeolite-based catalyst of from about 0.1 wt. % to about 5.0 wt. % or from about 0.5 wt. % to about 4.0 wt. %. These halide weight concentrations are recited based on the dry weight of the calcined zeolite-based catalyst prior to reduction.

In the chloride-containing zeolite-based catalysts, the catalyst can comprise up to about 5.0 wt. %, up to about 4.0 wt. %, up to about 3.5 wt. %, up to about 3.0 wt. %, or up to about 2.5 wt. % chloride, in which these concentrations are based on the dry weight of the calcined zeolite-based catalyst prior to reduction. In the fluoride-containing catalysts, the catalyst can comprise up to about 5.0 wt. %, up to about 4.0 wt. %, up to about 3.5 wt. %, up to about 3.0 wt. %, or up to about 2.5 wt. % fluoride relative to the dry weight of the calcined zeolite-based catalyst prior to reduction.

In a further aspect, the zeolite-based depolymerization catalyst can further comprise a promoter selected from a Group 1, 2, 14 or 15 metal. In particular, the zeolite-based catalyst can further comprise a promoter selected from tin, bismuth, or a combination thereof. When the promoter comprises tin, the tin content can be imparted by treating the zeolite or the zeolite-based depolymerization catalyst itself with a tin salt or compound, such as stannous chloride, stannic chloride, stannic tartrate, stannic nitrate, and the like.

In a further aspect of this disclosure, the step of contacting the process feed with the zeolite-based catalyst to form a reactor effluent can further comprise contacting the process feed in the depolymerization reactor with a non-zeolite cracking catalyst. In this aspect, a non-zeolite cracking catalyst can comprise or can be selected from clays, acid treated clays, perovskites, layered titanates, silica alumina, silica-coated alumina, acidic alumina, tungstated zirconia, activated carbon, natural kaolin, acid-modified kaolin, bentonite, and the like.

The zeolite-based catalyst used according to this disclosure can be characterized by a suitable pore volume of the zeolite, examples of which are about 0.10 mL/g, about 0.25 mL/g, about 0.50 mL/g, about 0.75 mL/g, about 1.0 mL/g, about 1.25 mL/g, about 1.50 mL/g, about 1.75 mL/g, about 2.0 mL/g, or any range between any of these zeolite pore volumes. In some aspects the zeolite-based catalyst is characterized zeolite pore volumes of from about 0.10 mL/g to about 2.0 mL/g, from about 0.25 mL/g to about 1.75 mL/g, or from about 0.50 mL/g to about 1.50 mL/g. These quantitative pore volumes are features of the starting zeolite itself prior to forming the catalyst using the transition metals and promoters as described herein.

The zeolite-based catalyst can also be characterized by a catalyst surface area of about 100 $m^2$/g, about 200 $m^2$/g, about 300 $m^2$/g, about 400 $m^2$/g, about 500 $m^2$/g, about 600 $m^2$/g, about 700 $m^2$/g, about 800 $m^2$/g, about 900 $m^2$/g, about 1,000 $m^2$/g, or any range between any of these surface areas. In some aspects, the zeolite-based catalyst is characterized a catalyst surface area of from about 100 $m^2$/g to about 1,000 $m^2$/g, from about 200 $m^2$/g to about 1,000 $m^2$/g, or from about 200 $m^2$/g to about 900 $m^2$/g.

The zeolite pore diameters of the zeolite-based catalysts can vary. In an aspect, the zeolite-based catalyst can be characterized by a zeolite pore diameter of from about 4.0 Å (0.4 nm) to about 10 Å (1 nm), from about 5.0 Å (0.5 nm) to about 9.0 Å (0.9 nm), or from about 5.5 Å (0.55 nm) to about 7.0 Å (0.7 nm). In a further aspect, the zeolite-based catalyst is characterized by a pore diameter of from about 7 Å (0.7 nm) to about 10 Å (1 nm), from about 5 Å (0.5 nm) to about 6 Å (0.6 nm), or from about 2 Å (0.2 nm) to about 3 Å (0.3 nm). These quantitative pore diameters are features of the starting zeolite itself prior to forming the catalyst using the transition metals and promoters as described herein.

In embodiments, the zeolite-based catalyst is in particulate form and can have an average particle size of from about 2 μm to about 300 μm, from about 3 μm to about 200 μm, from about 4 μm to about 100 μm, or from about 5 μm to about 25 μm. For example, the zeolite-based catalyst can comprise Y-zeolite and can be in particulate form having an average particle size of from about 3 μm to about 8 μm. The zeolite-based catalyst may also comprise ZSM-5 zeolite and can be in particulate form having an average particle size of from about 5 μm to about 10 μm. In another aspect, the zeolite-based catalyst can comprise H-MOR and can be in particulate form having an average particle size of from about 12 μm to about 18 μm. The zeolite-based catalyst also may comprise beta Zeolite and can be in particulate form having an average particle size of from about 3 μm to about 5 μm.

According to a further aspect, the process feed can be contacted under depolymerization conditions with a non-zeolite cracking catalyst. For example, the process for converting plastic waste can further comprise contacting the process feed in the depolymerization reactor with a non-zeolite cracking catalyst comprising or selected from clays, acid treated clays, perovskites, layered titanates, silica alumina, silica-coated alumina, acidic alumina, tungstated zirconia, activated carbon, natural kaolin, acid-modified kaolin, bentonite, or any combination thereof.

In another aspect, the first depolymerization catalyst and the second depolymerization catalyst, independently, can comprise a chromia-based catalyst, or chromia-based catalyst in combination with zeolite-based catalyst. For example, the chromia-based catalyst may comprise a chromium oxide such as amorphous $Cr_2O_3$ or crystalline $Cr_2O_3$. The chromia-based catalyst may be supported on silica, silica-alumina, silica-coated alumina, silica-titania, silica-magnesia, alumina, zirconia, thoria, mixed oxides thereof, or mixtures thereof. For example, the chromia-based catalyst can comprise: chromia-alumina; chromia-magnesia-alumina; magnesium chromite-tin oxide; magnesium chromite-alumina-tin oxide; magnesium chromite combined with a promoter selected from B, Si, Sn, Pb, Zn, or Se; or any combination thereof. The B, Si, Sn, Pb, Zn, or Se promoter can be present from 0.1 wt. % to 10 wt. % relative to the combined chromia (on a $Cr_2O_3$ basis) and the promoter.

Metathesis Catalysts

The metathesis catalysts used in the second heating zone can comprise any metathesis catalyst and can include olefin metathesis catalysts, those catalysts commonly referred to as alkane metathesis catalysts, or combinations thereof. In an aspect, the alkane metathesis catalysts can dehydrogenate alkanes to form olefins, effect olefin metathesis, and re-hydrogenate the olefins back to alkanes. These catalysts may be referred to as simply metathesis catalysts. Reference is made to Handbook of Metathesis; Ed. R. H. Grubbs, A. G. Wenzel, D. J. O'Leary, and E. Khosravi; vol. 1-3; c. 2015; Wiley-VCH Verlag GmbH & Co. KGaA, which is incorporated herein by reference in pertinent part, for describing suitable olefin and alkane metathesis catalysts.

According to aspects of this disclosure, the metathesis catalyst comprises an olefin metathesis catalyst, an alkane metathesis catalyst, or a combination thereof. For example, the metathesis catalyst can comprise a metal oxide-based metathesis catalyst, a metal halide-based metathesis catalyst, or any combination thereof. The metathesis catalyst may include cobalt oxide, molybdenum oxide, tungsten oxide, rhenium oxide, or any combination thereof. In another aspect, the metathesis catalyst may comprise or further comprise a supported zirconium hydride, tantalum hydride, tungsten hydride, zirconium alkyl, tantalum alkyl, molybdenum alkyl, tungsten alkyl, tantalum alkylidene, molybdenum alkylidene, tungsten alkylidene, molybdenum alkylidyne, or tungsten alkylidyne. In any of these catalysts, the metathesis catalyst may also comprise a support selected from alumina, silica, silica-alumina, silica-coated alumina, aluminum-phosphate, zirconia or any combination thereof.

In an aspect, the metathesis catalyst may comprise molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof. The metathesis catalyst may comprise a molybdenum halide, a tungsten halide, or a combination thereof, wherein the halide is chloride, bromide, or iodide.

In another aspect, the metathesis catalyst can further comprise a metal alkyl activator. For example, the metathesis catalyst can include a metal alkyl activator comprising $LiR$, $MgR_2$, $AlR_3$, $AlR_2X$, $AlRX_2$, $SnR_4$, or combinations thereof, wherein R is independently a $C_1$-$C_{12}$ alkyl group, a $C_1$-$C_8$ alkyl group, or a $C_1$-$C_5$ alkyl group, and X is chloride, bromide, or iodide. Examples of suitable metal alkyl activators include trimethylaluminum, triethylaluminum, triisobutylaluminum, ethylaluminum dichloride, diethylaluminum chloride, ethylaluminum sesquichloride, tetramethyl tin, tetraethyl tin, or tetrabutyl tin.

The metathesis catalyst can also comprise an activator selected from oxygen, an alcohol activator, or a combination thereof. For example, the metathesis catalyst can comprise an alcohol activator selected from methanol, ethanol, n-propanol, i-propanol, n-butanol, t-butanol, or sec-butanol.

In an aspect, examples of suitable metathesis catalysts include tungsten chloride/tetrabutyl tin ($WCl_6/SnMe_4$), tungsten chloride/ethylaluminum dichloride ($WCl_6/EtAlCl_2$), tungsten chloride/ethylaluminum dichloride/ethyl alcohol ($WCl_6/EtAlCl_2/EtOH$), molybdenum chloride/triethyl aluminum ($MoCl_5/AlEt_3$), and molybdenum chloride/triethyl aluminum/oxygen ($MoCl_5/AlEt_3/O_2$).

Chemically-Modified Solid Oxide (SSA)

In an aspect of the disclosure, a chemically-modified solid oxide comprising a solid oxide treated with an electron-withdrawing anion can be used in a variety of ways to enhance the conversion of the plastic waste. These chemically-modified solid oxide materials, which may be referred to herein as a solid super-acid, or "SSA", can augment the depolymerization process. For example, the polyolefin waste feed or the process feed can be contacted with an SSA in the first heating zone or in a pre-heating zone, in the presence or the absence of the light hydrocarbon co-feed. In another aspect, an independently selected SSA can be used to contact the polyolefin waste feed, the process feed, the first effluent, the second effluent, or combinations thereof. This process can further comprise heating the polyolefin waste feed or the process feed in the first heating zone or in a pre-heating zone in the presence of a chemically-modified solid oxide comprising a solid oxide treated with an electron-withdrawing anion, in the presence or the absence of the light hydrocarbon co-feed.

In an aspect, the process disclosed herein can further comprise contacting the first effluent, the second effluent, or both the first effluent and the second effluent in the second heating zone or optionally, in the third heating zone, with an independently selected chemically-modified solid oxide, each comprising a solid oxide treated with an electron-withdrawing anion. Another aspect provides that the disclosed process may further comprise heating the first effluent, the second effluent, or both the first effluent and the second effluent in the second heating zone or optionally, in the third heating zone, in the presence of an independently selected chemically-modified solid oxide, each comprising a solid oxide treated with an electron-withdrawing anion.

In another aspect, the zeolite-based catalyst may further comprise a chemically-modified solid oxide comprising a solid oxide treated with an electron-withdrawing anion.

The chemically-modified solid oxide can be generated by treatment of a solid oxide with an acid of an electron-withdrawing anion or a salt of an electron-withdrawing anion. Following treatment of the solid oxide with the acid or the salt of an electron-withdrawing anion, the chemically-modified solid oxide can be dried and calcined.

In embodiments, the solid oxide of the chemically-modified solid oxide can comprise or can be selected from $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $Ce_2O_3$, mixtures thereof, mixed oxides thereof (for example, silica-alumina), and any combinations thereof. For example, the chemically-modified solid oxide can comprise a solid oxide comprising or selected from silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, or any combination thereof.

In a further aspect, the chemically-modified solid oxide comprises a solid oxide that is chemically modified with an electron-withdrawing anion, wherein the electron-withdrawing anion comprises or is selected from sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, fluoride, chloride, or any combination thereof. For example, the chemically-modified solid oxide can be generated by treatment of a solid oxide with sulfuric acid, sulfate ion, bisulfate ion, fluoro sulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof.

Therefore, in an aspect, the chemically-modified solid oxide can comprise a sulfur oxoacid anion-modified solid oxide, a phosphorus oxoacid anion-modified solid oxide, or a halide ion-modified solid oxide. For example, the chemically-modified solid oxide can comprise a sulfated solid oxide, bisulfated (hydrogen sulfated) solid oxide, fluoro sulfated solid oxide, phosphated solid oxide, fluorophosphated solid oxide, fluorided solid oxide, or chlorided solid oxide.

In further aspects, the chemically-modified solid oxide can comprise a solid oxide that is chemically modified with an electron-withdrawing anion, wherein:

- the solid oxide can comprise or be selected from silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and
- the electron-withdrawing anion can comprise or be selected from sulfate, bisulfate, fluorosulfate, phosphate, fluorophosphates, fluoride, or chloride.

For example, the chemically-modified solid oxide can comprise sulfated alumina, sulfated silica-alumina, or sulfated silica-coated alumina.

According to another aspect, the chemically-modified solid oxide itself can be metal-treated with a metal cation selected from a Group 1, 2, 12, or 13 metal.

Process Conditions

If desired, the polyolefin waste feed or the process feed can be pre-heated in a pre-heating zone prior to feeding the polyolefin waste feed or the process feed to the first heating zone. For example, the polyolefin waste feed or the process feed can be pre-heating to a temperature that is from 10° F. (5.6° C.) to 40° F. (22° C.) below the boiling temperature of the light hydrocarbon co-feed at the process pressures or from 15° F. (8° C.) to 50° F. (28° C.) below the boiling temperature of the hydrocarbon co-feed at the process pressures, prior to being provided to the first heating zone.

The heating conditions required to melt the polyolefin feed are affected by the characteristics of the polyolefin itself. In an aspect, the polyolefin waste feed or the process feed can be pre-heated in a pre-heating zone to a temperature of from about 150° F. (66° C.) to about 350° F. (177° C.), from about 170° F. (77° C.) to about 300° F. (149° C.), or from about 190° F. (88° C.) to about 280° F. (138° C.) prior to being provided to the first heating zone. The light hydrocarbon feed can be pre-heated if desired. Because the polyolefin waste feed can include a range of different solid polyolefins or other plastic waste products in addition to the solid polyolefin waste, the pre-heating can occur over a range of temperatures, including up to or slightly higher than the temperature at which the highest melting temperature solid will melt.

In an aspect, the polyolefin waste feed or the process feed can be pre-heated in a pre-heating zone to a temperature of about 150° F. (66° C.), about 160° F. (71° C.), about 170° F. (77° C.), about 180° F. (82° C.), about 190° F. (88° C.), about 200° F. (93° C.), about 210° F. (99° C.), about 220° F. (104° C.), about 230° F. (110° C.), about 240° F. (116° C.), about 250° F. (121° C.), about 260° F. (127° C.), about 270° F. (132° C.), about 280° F. (138° C.), about 290° F. (143° C.), about 300° F. (149° C.), about 310° F. (154° C.), about 320° F. (160° C.), about 330° F. (166° C.), about 340° F. (171° C.), or about 350° F. (177° C.), prior to being provided to the first heating zone.

Regarding depolymerization conditions, the depolymerization conditions used in the first heating zone and the optional third heating zone can be selected independently. Unless otherwise indicated, reference in this disclosure to depolymerization conditions is intended to reflect conditions which can be applied to the first heating zone and the optional third heating zone independently. The depolymerization conditions can comprise heating the process feed in the first heating zone while contacting the process feed with the first depolymerization catalyst, and can further comprise heating the second effluent in the third heating zone while contacting the second product feed with the second depolymerization catalyst. In an aspect, the depolymerization conditions can comprise heating the process feed or the second effluent (or a portion thereof) to a temperature of from 300° F. (149° C.) to 1,000° F. (538° C.), from 400° F. (204° C.) to 900° F. (482° C.), or from 450° F. (232° C.) to 800° F. (427° C.) while contacting the process feed or the second effluent with the second or third depolymerization catalyst, respectively. For example, the depolymerization conditions comprise heating the process feed or the second effluent in the first or third heating zone, respectively, to a temperature of about 300° F. (149° C.), about 350° F. (177° C.), about 400° F. (204° C.), about 450° F. (232° C.), about 500° F. (260° C.), about 550° F. (288° C.), about 600° F. (316° C.), about 650° F. (343° C.), about 700° F. (371° C.), about 750° F. (399° C.), about 800° F. (427° C.), about 850° F. (454° C.), about 900° F. (482° C.), about 950° F. (510° C.), about 1000° F. (538° C.), or any range between any of these temperatures, while contacting the process feed and the first or second depolymerization catalyst, respectively.

In another aspect, the depolymerization conditions can comprise heating the process feed or the second effluent with the first or second depolymerization catalyst, respectively, in the presence of hydrogen. Alternatively, the process feed or the second effluent and the first or second depolymerization catalyst, respectively, can be heated in the absence of hydrogen. In an aspect, the step of contacting the process feed or the second effluent and the independently selected depolymerization catalyst can be conducted in the presence of hydrogen at a pressure of from about 5 psig (34 kPa) to about 1,000 psig (6895 kPa), from about 50 psig (335 kPa) to about 800 psig (5516 kPa), or from about 100 psig (689 kPa) to about 650 psig (4482 kPa).

One aspect of the disclosure provides for contacting the process feed or the second effluent and the independently selected depolymerization catalyst in the presence of hydrogen at a pressure of about 5 psig (34 kPa), about 25 psig (172 kPa), about 50 psig (335 kPa), about 100 psig (689 kPa), about 150 psig (1034 kPa), about 200 psig (1379 kPa), about 250 psig (1724 kPa), about 300 psig (2068 kPa), about 350 psig (2413 kPa), about 400 psig (2758 kPa), about 450 psig (3103 kPa), about 500 psig (3447 kPa), about 550 psig (3792 kPa), about 600 psig (4137 kPa), about 650 psig (4482 kPa), about 700 psig (4826 kPa), about 750 psig (5171 kPa), about 800 psig (5516 kPa), about 850 psig (5861 kPa), about 900 psig (6205 kPa), about 950 psig (6550 kPa), about 1000 psig (6895 kPa), or any range between any of these pressures. However, the depolymerization conditions can include heating the process feed or the second effluent and the independently selected depolymerization catalyst in the first or third heating zone, respectively, in the absence of hydrogen.

In an aspect of the disclosed process, the halogen concentration in the process feed can be reduced prior to being provided to the first heating zone. For example, the halogen concentration in the polyolefin waste feed, the light hydrocarbon co-feed, or both the polyolefin waste feed and the light hydrocarbon co-feed can be reduced prior to being provided to the first heating zone. Whether the halogen concentration in the process feed is reduced or is not reduced prior to being provided to the first heating zone, the chlorine concentration or the fluorine concentration by weight in the process feed can be, independently, less than 100 ppm, less than 90 ppm, less than 80 ppm, less than 70 ppm, less than 60 ppm, less than 50 ppm, less than 40 ppm, less than 30 ppm, less than 20 ppm, less than 10 ppm, or less than 5 ppm prior to being provided to the first heating zone.

The first effluent or at least a portion thereof is provided to a second heating zone, where the first effluent is heated in the presence of a metathesis catalyst under metathesis conditions to form a second effluent. The metathesis conditions can comprise heating the first effluent and the metathesis catalyst in the second heating zone to a temperature of from 300° F. (149° C.) to 1,000° F. (538° C.), from 400° F. (204° C.) to 900° F. (482° C.), or from 450° F. (232° C.) to 800° F. (427° C.) while contacting the first effluent with the metathesis catalyst.

In an aspect, the metathesis conditions can comprise heating the first effluent and the metathesis catalyst in the second heating zone in the presence of hydrogen or in the absence of hydrogen. For example, the first effluent and the metathesis catalyst can be heated in the second heating zone in the presence of hydrogen at a pressure of from about 5 psig (34 kPa) to about 1,000 psig (6895 kPa), from about 50 psig (335 kPa) to about 800 psig (5516 kPa), or from about 100 psig (689 kPa) to about 650 psig (4482 kPa).

A further aspect provide that the metathesis conditions can comprise heating the first effluent and the metathesis catalyst in the second heating zone in the presence of hydrogen at a pressure of about 5 psig (34 kPa), about 25 psig (172 kPa), about 50 psig (335 kPa), about 100 psig (689 kPa), about 150 psig (1034 kPa), about 200 psig (1379 kPa), about 250 psig (1724 kPa), about 300 psig (2068 kPa), about 350 psig (2413 kPa), about 400 psig (2758 kPa), about 450 psig (3103 kPa), about 500 psig (3447 kPa), about 550 psig (3792 kPa), about 600 psig (4137 kPa), about 650 psig (4482 kPa), about 700 psig (4826 kPa), about 750 psig (5171 kPa), about 800 psig (5516 kPa), about 850 psig (5861 kPa), about 900 psig (6205 kPa), about 950 psig (6550 kPa), about 1000 psig (6895 kPa), or any range between any of these pressures.

Output Streams and Circular Products

Once the process feed and the first depolymerization catalyst have been contacted under depolymerization conditions to form a first effluent, at least a portion of the first effluent is provided to second heating zone where it is contacted with a metathesis catalyst, producing a second effluent. The second effluent can be used as follows: (i) at least a portion of the second effluent can be separated into a plurality of output streams; (ii) at least a portion of the second effluent can be heated with a second depolymerization catalyst third heating zone to form a third effluent, can be separated into a plurality of output streams; or (iii) both (i) and (ii).

Each of the first, second, and third effluents constitute reactor effluents which can include a liquid effluent and also can include a gaseous effluent which may be discharged, for example, from overhead its respective reactor. For example, light hydrocarbons such as $C_2$-$C_3$ hydrocarbons can be removed from the first heating zone, after the first heating zone ahead of the metathesis reactor, from the second heating zone, from the third heating zone, or any combination thereof. The light hydrocarbons which are removed in this fashion can be $C_3$ and lighter hydrocarbons, $C_4$ and lighter hydrocarbons, or $C_5$ and lighter hydrocarbons. A separations unit can separates the reactor effluents into a plurality of output streams, each output stream comprising at least one circular product. By describing a reactor effluent, it is intended to reflect that there may be more than one reactor effluent from each heating zone or reactor that can be further separated.

According to an aspect, one or more output streams can comprise halogenated hydrocarbons in a first concentration, and the process can further comprise contacting the one or more output streams with a dehydrohalogenation catalyst to reduce the first concentration of halogenated hydrocarbons to a second concentration. For example, the dehydrohalogenation catalyst comprises a Group 4-13 metal supported on a metal oxide or aluminosilicate support. In an aspect, the dehydrohalogenation catalyst can comprises chromium, molybdenum, tungsten, iron, ruthenium, osmium, cobalt, rhodium, iridium, nickel, palladium, platinum, zinc, magnesium, gallium, titanium, tantalum, or any combination thereof, supported on alumina, silica, silica-alumina, silica-coated alumina, titania, zirconia, a zeolite, a molecular sieve, aluminophosphate, or a combination thereof.

Each effluents can include a plurality of output streams, for example, a light hydrocarbon stream, a medium hydrocarbon stream, a heavy hydrocarbon stream, or any combination thereof. One of the plurality of output streams can comprise $C_2$-$C_5$ hydrocarbons. One of the plurality of output streams comprises $C_6$-$C_8$ hydrocarbons. Another of the plurality of output streams comprises $C_{9+}$ hydrocarbons. In each of these cases, the process can further comprise dehalogenation of the halogenated hydrocarbons in any output stream, for example, in an $C_2$-$C_5$ hydrocarbon output stream or a $C_6$-$C_8$ hydrocarbon output stream.

In an aspect, one output stream from any heating zone or reactor can comprise $C_2$-$C_5$ hydrocarbons, and the process may further comprise providing the $C_2$-$C_5$ hydrocarbons to a steam cracker to produce a stream cracker effluent comprising circular ethylene and/or circular propylene. In a further aspect, one output stream from any heating zone or reactor can comprise $C_6$-$C_8$ hydrocarbons, and the process can further comprise providing the $C_6$-$C_8$ hydrocarbons to a reforming unit or an AROMAX® unit to produce one or more circular aromatic products. Another aspect provides that one output stream from any heating zone or reactor can comprise $C_6$-$C_8$ hydrocarbons, and the process can further comprise providing the $C_6$-$C_8$ hydrocarbons to a steam cracker to produce a stream cracker effluent comprising circular ethylene and/or circular propylene. In an aspect, one or more of the output streams can be recycled to an earlier heating zone. For example, the $C_{9+}$ heavies product from the second effluent or the third effluent can be recycled to the first depolymerization reactor.

The amount or the fraction of the circular product attributable to the polyolefin waste feed or the additional plastic waste feed or the light hydrocarbon feed in one or more output streams can be determined by mass balance. In another aspect, the process further comprises certifying the circular product attributable to the polyolefin waste feed or the additional plastic waste feed in one or more output streams as Circular in accordance with International Sustainability and Carbon Certification (ISCC) standards, based upon the amount or the fraction of the circular product attributable to the polyolefin waste feed or the additional plastic waste feed in one or more output streams determined by mass balance and the free attribution method.

Tandem Depolymerization and Metathesis System

In addition to the tandem depolymerization-metathesis process described herein, this disclosure provides a tandem depolymerization-metathesis reactor system for converting plastics including plastic wastes to hydrocarbons, specifically liquid and gaseous depolymerization reactor products, which subsequently can be used as feeds or co-feeds for making circular products.

In an aspect, there is provided a system for converting plastic waste, the system comprising:

(a) a first heating zone configured to receive a process feed through a first feed inlet, heat the process feed in the presence of a first depolymerization catalyst, and discharge a first effluent through at least one first product outlet;

(b) a second heating zone configured to receive at least a portion of the first effluent through a second feed inlet, heat the first effluent in the presence of a metathesis catalyst, and discharge a second effluent through at least one second product outlet;

(c) an optional third heating zone configured to receive the second effluent through a third feed inlet, heat the second effluent in the presence of a second depolymerization catalyst, and discharge a third effluent through at least one third product outlet; and (d) a separation unit, configured to receive and separate the second effluent or the third effluent into a plurality of output streams, each output stream comprising a circular product.

In this system, the third heating zone can be present or the third heating zone can be absent. In another aspect of this system, the first heating zone and the second heating zone can occur in a single reactor, or the first heating zone and the second heating zone occur in separate reactors in series. The first heating zone, the second heating zone, and the third heating zone occur in a single reactor, or the first heating zone, the second heating zone, and the third heating zone occur in separate reactors in series.

The tandem depolymerization-metathesis system described herein can further comprise a pre-heating zone configured to pre-heat the process feed or a component thereof and feed the pre-heated process feed or the component thereof to the first heating zone through the first feed inlet. In one aspect, the pre-heating zone can comprise an extruder. In another aspect, the first heating zone, the second heating zone, and if applicable, the third heating zone, or any combination thereof independently can comprise a fluidized bed reactor of a fixed bed reactor.

The tandem depolymerization-metathesis system may further comprise a recycle line configured to recycle one of the output streams from the separation unit to the first heating zone. In an aspect, the first heating zone further comprising an auxiliary feed inlet configured to receive a light hydrocarbon co-feed. If desired, each of the product outlets, independently, can include a gaseous effluent outlet and a liquid effluent outlet. For example, if desired, the at least one first product outlet from the first heating zone can comprise a gaseous effluent outlet and a liquid effluent outlet. The at least one second product outlet of the second heating zone comprises a gaseous effluent outlet and a liquid effluent outlet if desired. In another aspect, the at least one third product outlet of the third heating zone can comprise a gaseous effluent outlet and a liquid effluent outlet.

The separation unit of the tandem depolymerization-metathesis system can comprise one or more condensers downstream of the third heating zone, when present, or downstream of the second heating zone when not present, configured to separate the second effluent or the third effluent into the plurality of output streams. The separation unit can be configured to separate the second effluent or the third effluent into a light hydrocarbon stream comprising $C_2$-$C_5$ hydrocarbons, a medium hydrocarbon stream comprising $C_6$-$C_8$ hydrocarbons, and a heavy hydrocarbon stream comprising $C_{9+}$ hydrocarbons.

In one aspect, the separation unit can be configured to provide a $C_2$-$C_5$ hydrocarbon stream, and the system can further comprise a steam cracker configured to receive the $C_2$-$C_5$ hydrocarbon stream and produce a stream cracker effluent comprising circular ethylene and/or circular propylene. In another aspect, the separation unit can be configured to provide a $C_6$-$C_8$ hydrocarbon stream, the system can further comprise a steam cracker configured to receive the $C_6$-$C_8$ hydrocarbon stream and produce a stream cracker effluent comprising circular ethylene and/or circular propylene.

In a further aspect, the separation unit of the tandem depolymerization-metathesis system can be configured to provide a $C_6$-$C_8$ hydrocarbon stream, and the system can further comprise an AROMAX® unit or a reforming unit configured to receive the $C_6$-$C_8$ hydrocarbon stream and produce one or more circular aromatic products.

In another aspect, the separation unit of the tandem depolymerization-metathesis system can be configured to provide a $C_9$ and heavier ($C_{9+}$) hydrocarbon stream, the system further comprising a fluid catalytic cracker (FCC) configured to receive the $C_{9+}$ stream and produce an FCC effluent comprising circular naphtha ($C_6$-$C_{10}$ hydrocarbons) and circular $C_5$ and lighter ($C_{5-}$) hydrocarbons. The system can further comprise a pretreater between the separation unit and the fluid catalytic cracker (FCC) configured to receive the $C_{9+}$ stream and form a treated $C_{9+}$ stream having a lower sulfur, halogen, or aromatic content as compared with the $C_{9+}$ stream prior to pretreating.

When a heavy hydrocarbon stream is provided from the separation unit, it can be recycled to the first depolymerization reactor for further processing. In an aspect, the separation unit can be configured to provide a heavy hydrocarbon stream, and the system can further comprise a recycle pump and recycle line from the separation unit to the first depolymerization reactor to return at least a portion of the heavy hydrocarbon stream from the separation unit to the first depolymerization reactor.

If desired, the tandem depolymerization-metathesis system can further comprise a dehydrohalogenation unit downstream of the separation unit configured to receive any one of the plurality of output streams and reduce the halogen concentration therein.

EXAMPLES

FIG. 1 illustrates one embodiment of the tandem depolymerization-metathesis process and system for converting plastic waste and producing of circular products, in which the second effluent or a portion thereof is provided directly to a separation unit without a being provided to a third heating zone, and therefore delivered to a separations unit without having been contacted with a second depolymerization catalyst. The tandem depolymerization-metathesis system 10 of FIG. 1 includes a first heating zone 15 which receives as a process feed a polyolefin waste feed 20 and a light hydrocarbon co-feed 25, illustrated as separate co-feeds in this embodiment. In the first heating zone 15, the process feed is heated in the presence of a first depolymerization catalyst under depolymerization conditions to form a first effluent, which can be provided to a second heating zone where it is contacted with a metathesis catalyst. Alternatively, as shown in the embodiment of FIG. 1, a lighter portion 30 of the first effluent is removed from or immediately after the first heating zone ahead of the second heating zone, and the heavier portion 35 of the first effluent is delivered to a second heating zone 40.

In the second heating zone 40, the first effluent or a heavier portion 35 of the first effluent as shown in FIG. 1 is heated in the presence of a metathesis catalyst under metathesis conditions to form a second effluent, which can be delivered to a separation unit. Alternatively, as shown in the embodiment of FIG. 1, a lighter portion 45 of the second effluent is removed from or immediately after the second heating zone ahead of the separation unit, and the heavier portion 50 of the second effluent is delivered to the separation unit 55 where it can be separated into plurality of output streams.

In the FIG. 1 embodiment, the separation unit 55 is shown to separate heavier portion 50 of the second effluent into a light ($C_2$-$C_5$) output stream 60, a medium ($C_6$-$C_8$) output stream 65, and a heavy ($C_{9+}$) output stream 70. As illustrated, this process and system can further include the option of recycling at least a portion of the heavy fraction from the separation unit to the first depolymerization reactor.

The FIG. 1 embodiment also illustrates an optional dehydrohalogenation (or "dehalogenation") unit 75 downstream of the separation unit 55 which is configured to receive the light ($C_2$-$C_5$) output stream 60 and reduce the concentration of or remove halogenated components. In this embodiment, the dehalogenated light output stream is fed to a steam cracker 80 to produce a stream cracker effluent comprising circular ethylene and/or circular propylene. Also illustrated are AROMAX® unit or reforming unit 85 adapted to receive medium ($C_6$-$C_8$) output stream 65 from separation unit 55 and produce one or more circular aromatic products. The medium ($C_6$-$C_8$) output stream 65 can also be fed to steam cracker 80 to produce a stream cracker effluent comprising circular ethylene and/or circular propylene.

Also illustrated in the FIG. 1 embodiment is a heavy ($C_{9+}$) output stream 70 which can be fed to fluid catalytic cracker (FCC) 90 to produce a lighter hydrocarbon stream for further use. If desired, at least a portion of heavy ($C_{9+}$) output stream 70 can be recycled to the first heating zone or first depolymerization reactor 15 by way of recycle line 100, to improve the yields of the light and medium hydrocarbons and any downstream circular products produced therefrom.

If desired, the polyolefin waste feed, the light hydrocarbon co-feed, or the process feed can be pre-heated in a pre-heating zone, for example, in the presence of a chemically-modified solid oxide comprising a solid oxide treated with an electron-withdrawing anion. The FIG. 1 embodiment illustrates a pre-heating zone 105, in which the waste polyolefin feed can be pre-heated prior to being provided to the first heating zone.

Figure 2:
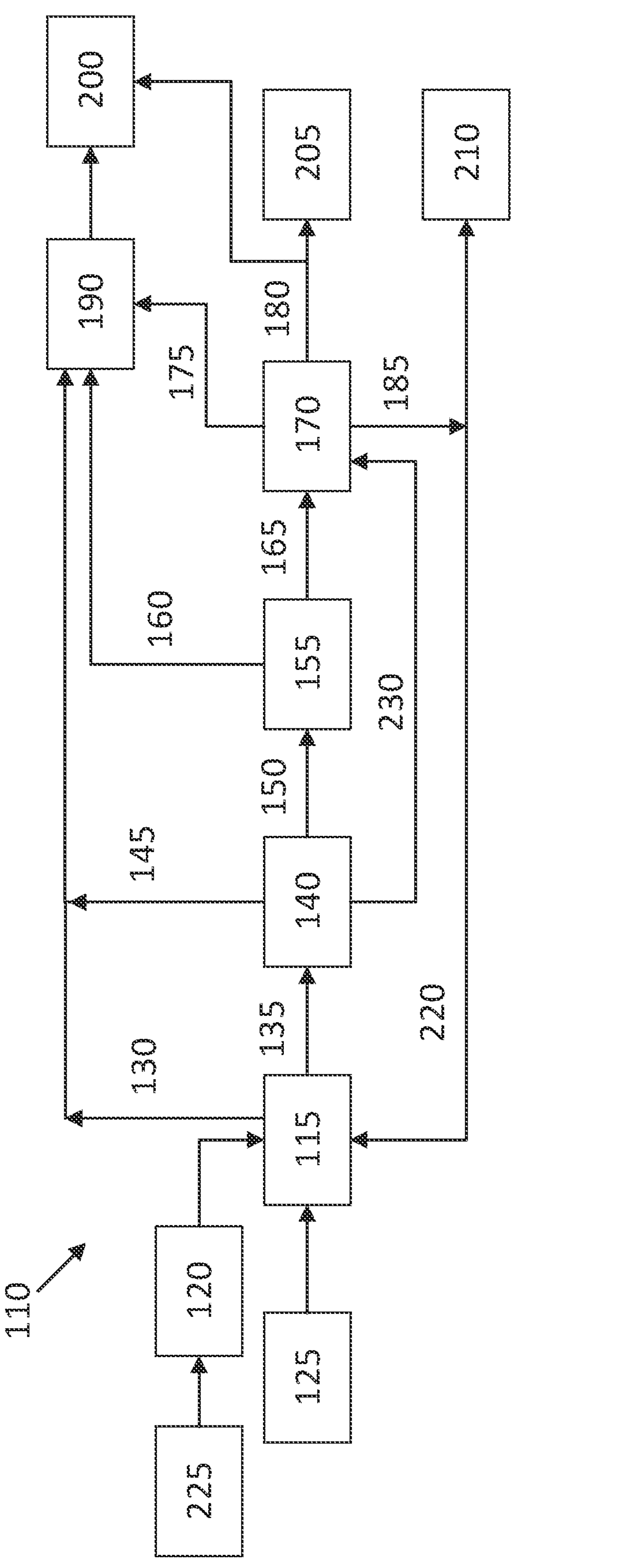
FIG. 2 illustrates another embodiment of the disclosure, showing an example of a tandem depolymerization-metathesis process for converting plastic waste and producing of circular products, in which the second effluent or a portion thereof is delivered to a third heating zone heated in the presence of a second depolymerization catalyst, prior to the effluent from the third heating zone being provided to separation unit.

FIG. 2 illustrates another embodiment of the tandem depolymerization-metathesis process and system for converting plastic waste and producing of circular products, in which the second effluent or a portion thereof is provided to a third heating zone (second depolymerization reactor) prior to the separation unit. The tandem depolymerization-metathesis system 110 of FIG. 2 includes a first heating zone 115 which receives as a process feed comprising a polyolefin waste feed 120 and a light hydrocarbon co-feed 125, illustrated as separate co-feeds in this embodiment, which are heated in the presence of a first depolymerization catalyst form a first effluent, which can be provided to a second heating zone. Alternatively, as illustrated in FIG. 2, a lighter portion 130 of the first effluent is removed ahead of the second heating zone, and the heavier portion 135 of the first effluent is delivered to a second heating zone 140.

In the second heating zone 140, the first effluent or a heavier portion 135 of the first effluent is heated in the presence of a metathesis catalyst to form a second effluent, which can be delivered to a third heating zone. Alternatively, as shown in the embodiment of FIG. 2, a lighter portion 145 of the second effluent is removed from or immediately after the second heating zone ahead of the third heating zone, and the heavier portion 150 of the second effluent is delivered to third heating zone 155, where it can be heated in the presence of a second depolymerization catalyst to form a third effluent, which can be provided to a separation unit. Alternatively, as illustrated in FIG. 2, a lighter portion 160 of the third effluent can be removed ahead of the separation unit 170, and the heavier portion 165 of the third effluent can be delivered to separation unit 170.

In the FIG. 2 embodiment, the separation unit 170 is shown to separate heavier portion 165 of the third effluent into a light ($C_2$-$C_5$) output stream 175, a medium ($C_6$-$C_8$) output stream 180, and a heavy ($C_{9+}$) output stream 185. As illustrated, this process and system can further include the option of recycling at least a portion of the heavy fraction from the separation unit to the first depolymerization reactor.

The FIG. 2 embodiment also illustrates an optional dehydrohalogenation (or "dehalogenation") unit 190 downstream of the separation unit 170 which is configured to receive the light ($C_2$-$C_5$) output stream 175 and reduce the concentration of halogenated components. In this embodiment, the dehalogenated light output stream is fed to a steam cracker 200 to produce a stream cracker effluent comprising circular ethylene and/or circular propylene. Also illustrated are AROMAX® unit or reforming unit 205 adapted to receive medium ($C_6$-$C_8$) output stream 180 from separation unit 170 and produce one or more circular aromatic products. The medium ($C_6$-$C_8$) output stream 180 can also be fed to steam cracker 200 to produce a stream cracker effluent comprising circular ethylene and/or circular propylene.

Further illustrated in the FIG. 2 embodiment is a heavy ($C_{9+}$) output stream 185 which can be fed to fluid catalytic cracker (FCC) 210 if desired to produce a lighter hydrocarbon stream for further use. If desired, at least a portion of heavy ($C_{9+}$) output stream 185 can be recycled to the first heating zone or first depolymerization reactor 115 by way of recycle line 220, to improve the yields of the light and medium hydrocarbons and any downstream circular products produced therefrom.

The polyolefin waste feed, the light hydrocarbon co-feed, or the combination thereof (the process feed) can be pre-heated in a pre-heating zone if desired, for example, in the presence of a chemically-modified solid oxide comprising a solid oxide treated with an electron-withdrawing anion. The FIG. 2 embodiment illustrates a pre-heating zone 225, in which the waste polyolefin feed can be pre-heated prior to being provided to the first heating zone.

The FIG. 2 embodiment further illustrates the option of bypassing the third heating zone with at least a portion of the second effluent, and providing this bypass portion 230 of the second effluent directly to a separation unit. This option still delivers a portion of the second effluent, for example, the heavier portion 150 of the second effluent, to third heating zone 155, where it is heated in the presence of a second depolymerization catalyst to form third effluent 165.

ASPECTS OF THE DISCLOSURE

The invention is described above with reference to numerous aspects, embodiments, and specific examples. Many variations will suggest themselves to those skilled in the art in light of the above detailed description. All such obvious variations are within the full intended scope of the appended claims. Other aspects of the invention can include, but are not limited to, the following Aspects which are described as "comprising" certain components or steps, may also "consist essentially of" or "consist of" those components or steps, unless stated otherwise.

Aspect 1. A process for converting plastic waste, the process comprising:

(a) providing a process feed comprising a polyolefin waste feed and a light hydrocarbon co-feed to a first heating zone;

(b) heating the process feed in the presence of a first depolymerization catalyst under depolymerization conditions to form a first effluent;

(c) providing the first effluent to a second heating zone;

(d) heating the first effluent in the presence of a metathesis catalyst under metathesis conditions to form a second effluent; and (e)(1) separating at least a portion of the second effluent into a plurality of output streams, each output stream comprising a circular product, (2)(A) providing at least a portion of the second effluent to a third heating zone and heating the second product feed in the presence of a second depolymerization catalyst under depolymerization conditions to form a third effluent, and (B) separating the third effluent into a plurality of output streams, each output stream comprising a circular product, or (3) conducting steps (e)(1), (e)(2)(A), and (e)(2)(B).

Aspect 2. The process according to Aspect 1, wherein the step (e)(1) is conducted.

Aspect 3. The process according to Aspect 1, wherein the steps (e)(2)(A) and (e)(2)(B) are conducted.

Aspect 4. The process according to Aspect 1, wherein the steps (e)(1), (e)(2)(A), and (e)(2)(B) are conducted.

Aspect 5. The process according to any of Aspects 1-4, wherein the first heating zone and the second heating zone occur in a single reactor.

Aspect 6. The process according to any of Aspects 1-4, wherein the first heating zone and the second heating zone occur in separate reactors in series.

Aspect 7. The process according to any of Aspects 1 and 3-4, wherein the first heating zone, the second heating zone, and the third heating zone occur in a single reactor.

Aspect 8. The process according to any of Aspects 1 and 3-4, wherein the first heating zone, the second heating zone, and the third heating zone occur in separate reactors in series.

Aspect 9. The process according to any of the preceding Aspects wherein the polyolefin waste feed, the light hydrocarbon co-feed, or both the polyolefin waste feed and the light hydrocarbon co-feed, are pre-heated prior to being provided to the first heating zone.

Aspect 10. The process according to any of the preceding Aspects wherein the polyolefin waste feed is preheated in a pre-heating zone prior to being provided to the first heating zone.

Aspect 11. The process according to any of the preceding Aspects wherein the polyolefin waste feed is preheated in a pre-heating zone comprising an extruder prior to being provided to the first heating zone.

Aspect 12. The process according to any of the preceding Aspects wherein the polyolefin waste feed is preheated in a pre-heating zone in the presence of the first depolymerization catalyst prior to being provided to the first heating zone.

Aspect 13. The process according to any of the preceding Aspects wherein the polyolefin waste feed and the light hydrocarbon co-feed are combined to form the process feed before, during, or after being provided the process feed to the first heating zone.

Aspect 14. The process according to any of the preceding Aspects, wherein the first depolymerization catalyst is the same as the second depolymerization catalyst.

Aspect 15. The process according to any of the preceding Aspects, wherein the first depolymerization catalyst is different from the second depolymerization catalyst.

Aspect 16. The process according to any of the preceding Aspects, wherein the first effluent comprises HCl in a concentration, and the first effluent is treated to reduce the concentration of the HCl prior to providing the first effluent to a second heating zone.

Aspect 17. The process according to any of the preceding Aspects, wherein the first heating zone, the second heating zone, and if applicable, the third heating zone, or any combination thereof comprises a fluidized bed reactor.

Aspect 18. The process according to any of the preceding Aspects, wherein the first heating zone, the second heating zone, and if applicable, the third heating zone, or any combination thereof comprises a fixed bed reactor.

Aspect 19. The process according to any of the preceding Aspects, wherein the polyolefin waste feed is a solid at 25° C.

Aspect 20. The process according to any of the preceding Aspects, wherein the process feed provided to the first heating zone is liquid.

Aspect 21. The process according to any of the preceding Aspects, wherein the first effluent, the second effluent, the third effluent, or any combination thereof comprise a gaseous product and a liquid product.

Aspect 22. The process according to any of the preceding Aspects, wherein the first effluent, the second effluent, or the third effluent comprises olefins, alkanes, or a combination thereof.

Aspect 23. The process according to any of the preceding Aspects, wherein the first effluent comprises a light fraction which is removed from the first heating zone.

Aspect 24. The process according to Aspect 23, wherein the light fraction comprises $C_3$ and lighter hydrocarbons, $C_4$ and lighter hydrocarbons, or $C_5$ and lighter hydrocarbons.

Aspect 25. The process according to any of the preceding Aspects, wherein the second effluent comprises a light fraction which is removed from the second heating zone.

Aspect 26. The process according to Aspect 25, wherein the light fraction comprises $C_3$ and lighter hydrocarbons, $C_4$ and lighter hydrocarbons, or $C_5$ and lighter hydrocarbons.

Aspect 27. The process according to any of the preceding Aspects, wherein one of the output streams is recycled to the first heating zone.

Aspect 28. The process according to any of the preceding Aspects, wherein the process feed comprises an additional plastic waste feed other than the polyolefin waste feed.

Aspect 29. The process according to any of the preceding Aspects, wherein the amount or the fraction of the circular product attributable to the polyolefin waste feed, the additional plastic waste feed, or the light hydrocarbon feed in one or more output streams is determined by mass balance.

Aspect 30. The process according to any of the preceding Aspects, wherein the process further comprises certifying the circular product attributable to the polyolefin waste feed or the additional plastic waste feed in one or more output streams as Circular in accordance with International Sustainability and Carbon Certification (ISCC) standards, based upon the amount or the fraction of the circular product attributable to the polyolefin waste feed or the additional plastic waste feed in one or more output streams determined by mass balance and the free attribution method.

Aspect 31. The process according to any of the preceding Aspects, wherein the polyolefin waste feed comprises polyethylene, polypropylene, polystyrene, or any combination thereof.

Aspect 32. The process according to any of the preceding Aspects, wherein the polyolefin waste feed comprises a catalyst residual in the polyolefin waste comprising a transition metal oxide, a main group metal oxide, or a combination thereof.

Aspect 33. The process according to any of the preceding Aspects, wherein the polyolefin waste feed comprises a catalyst residual in the polyolefin waste comprising an oxide of a Group 4 metal, a Group 5 metal, a Group 6 metal, a Group 7 metal, or any combination thereof.

Aspect 34. The process according to any of the preceding Aspects, wherein the polyolefin waste feed comprises a catalyst residual in the polyolefin waste comprising an oxide of Ti, Zr, Hf, Cr, or any combination thereof.

Aspect 35. The process according to any of the preceding Aspects, wherein the polyolefin waste feed comprises a catalyst residual in the polyolefin waste comprising silica, alumina, silica-alumina, magnesium oxide, or any combination thereof.

Aspect 36. The process according to any of the preceding Aspects, wherein the polyolefin waste feed comprises a catalyst residual in the polyolefin waste of a chemically-modified solid oxide comprising a solid oxide treated with an electron-withdrawing anion.

Aspect 37. The process according to any of the preceding Aspects, wherein the polyolefin waste feed is present in the process feed in a concentration of from greater than 0 wt. % or from 15 wt. % and up to 40 wt. %, 50 wt. %, 60 wt. %, 70 wt. %, or 80 wt. %.

Aspect 38. The process according to any of the preceding Aspects, wherein the polyolefin waste feed is present in the process feed in a concentration of about 10 wt. %, about 20 wt. %, about 30 wt. %, about 40 wt. %, about 50 wt. %, about 60 wt. %, about 70 wt. %, about 80 wt. %, or any range between any of these weight percentages.

Aspect 39. The process according to any of Aspects 28-38, wherein the additional plastic waste feed comprises polyester, polyamide, polyurethane, polyphenol, polycarbonate, polyvinyl halide, or any combination thereof.

Aspect 40. The process according to any of Aspects 28-39, wherein the additional plastic waste feed comprises polyethylene terephthalate (PET) or polyvinyl chloride (PVC).

Aspect 41. The process according to any of Aspects 28-40, wherein the additional plastic waste feed comprises polyvinyl chloride (PVC), and the polyvinyl chloride (PVC) is present in the process feed in a concentration of less than 10 wt. %, less than 5 wt. %, less than 2 wt. %, less than 1 wt. %, or less than 0.5 wt. %.

Aspect 42. The process according to any of Aspects 1-41, wherein the polyolefin waste feed, the additional plastic waste feed, or both the polyolefin waste feed and the additional plastic waste feed are a solid characterized by an average particle size of less than 2 mm, less than 5 mm, from 1 mm to 5 mm, from 5 mm to 10 mm, or from 10 mm to 20 mm.

Aspect 43. The process according to any of Aspects 1-41, wherein the polyolefin waste feed, the additional plastic waste feed, or both the polyolefin waste feed and the additional plastic waste feed are a solid characterized by an average particle size of less than 10 mm or less than 20 mm.

Aspect 44. The process according to any of the preceding Aspects, wherein the light hydrocarbon co-feed comprises a pyrolysis gas or liquid, a pyrolysis oil fraction, a petroleum-based co-feed, a fossil fuel-based co-feed, or a bio-based co-feed, or any combination thereof.

Aspect 45. The process according to any of the preceding Aspects, wherein the light hydrocarbon co-feed comprises a light ($C_2$-$C_5$) hydrocarbon, a light ($C_6$ or lower) pyrolysis liquid, a $C_5$-$C_6$ saturated hydrocarbon, natural gas liquids (NGL), light naphtha, or any combination thereof.

Aspect 46. The process according to any of the preceding Aspects, wherein the light hydrocarbon co-feed comprises a pyrolysis gas, a light pyrolysis liquid or a pyrolysis oil fraction derived from the pyrolysis of polyethylene, polypropylene, polystyrene, polyethylene terephthalate (PET), polyvinyl chloride (PVC), polyamide, polycarbonate, polyurethane, polyester, copolymers thereof, filled polymers thereof, composites thereof, natural or synthetic rubber, tires, or any combination thereof.

Aspect 47. The process according to any of the preceding Aspects, wherein the first depolymerization catalyst or the second depolymerization catalyst comprise, independently, a zeolite-based catalyst, a chromia-based catalyst, or a combination thereof.

Aspect 48. The process according to Aspect 47, wherein the zeolite-based catalyst, the chromia-based catalyst, or the combination thereof achieves dehydrogenation, hydrogenolysis, cracking, isomerization, dehydrohalogenation, dehalogenation, or a combination thereof, of the process feed.

Aspect 49. The process according to any of Aspects 47-48, wherein zeolite-based catalyst comprises any zeolite.

Aspect 50. The process according to any of Aspects 47-49, wherein the zeolite-based catalyst comprises L-Zeolite (Zeolite L or LTL), X-Zeolite (Zeolite X), Y-Zeolite (Zeolite Y), omega Zeolite, beta Zeolite, SAPO-34 Zeolite, USY Zeolite, HY Zeolite, ZSM-4, ZSM-5 (MFI), ZSM-10, ZSM-11, ZSM-12, ZSM-20, ZSM-22, ZSM-23, ZSM-34, ZSM-35, ZSM-50, REY, USY, RE-USY, LZ-210, LZ-210-A, LZ-210-M, LZ-210-T, SSZ-13, SSZ-24, SSZ-26, SSZ-31, SSZ-33, SSZ-35, SSZ-37, SSZ-41, SSZ-42, SSZ-44, MCM-58, H-MOR (H-mordenite), mazzite, faujasite, chabazite, a modified mesoporous form thereof, or any combination thereof.

Aspect 51. The process according to any of Aspects 47-50, wherein the zeolite-based catalyst comprises chromium, molybdenum, tungsten, iron, ruthenium, osmium, cobalt, rhodium, iridium, nickel, palladium, platinum, zinc, magnesium, gallium, titanium, tantalum, or any combination thereof.

Aspect 52. The process according to any of Aspects 47-51, wherein the zeolite-based catalyst comprises Pt-L-Zeolite, Pt-ZSM-5, Pt-Y zeolite, Pt-SAPO-34 zeolite, Pt-SSZ-13 zeolite, Pt-USY zeolite, Pt-HY zeolite, Pt-beta zeolite, or any combination thereof.

Aspect 53. The process according to any of Aspects 47-52, wherein the zeolite-based catalyst comprises fluorine, chlorine, bromine, iodine, or any combination thereof.

Aspect 54. The process according to any of Aspects 47-53, wherein the zeolite-based catalyst comprises a chloride concentration of from about 0.1 wt. % to about 4.0 wt. % or from about 0.5 wt. % to about 3.5 wt. % relative to the weight of the catalyst prior to reduction.

Aspect 55. The process according to any of Aspects 47-54, wherein the zeolite-based catalyst comprises a fluoride concentration of from about 0.1 wt. % to about 5.0 wt. % or from about 0.5 wt. % to about 4.0 wt. % relative to the weight of the catalyst prior to reduction.

Aspect 56. The process according to any of Aspects 47-55, wherein the zeolite-based catalyst comprises a chloride concentration of up to about 5.0 wt. %, up to about 4.0 wt. %, up to about 3.5 wt. %, up to about 3.0 wt. %, or up to about 2.5 wt. % chloride relative to the weight of the catalyst prior to reduction.

Aspect 57. The process according to any of Aspects 47-56, wherein the zeolite-based catalyst comprises a fluoride concentration of up to about 5.0 wt. %, up to about 4.0 wt. %, up to about 3.5 wt. %, up to about 3.0 wt. %, or up to about 2.5 wt. % fluoride relative to the weight of the catalyst prior to reduction.

Aspect 58. The process according to any of Aspects 47-57, wherein the zeolite-based catalyst comprises a promoter selected from a Group 1, 2, 14 or 15 metal.

Aspect 59. The process according to any of Aspects 47-58, wherein the zeolite-based catalyst comprises a promoter selected from tin or bismuth.

Aspect 60. The process according to any of Aspects 47-59, wherein the zeolite-based catalyst is treated with a tin salt, e.g., stannous chloride, stannic chloride, stannic tartrate, or stannic nitrate.

Aspect 61. The process according to any of Aspects 47-60, wherein the zeolite of the zeolite-based catalyst is characterized by a pore volume of about 0.10 mL/g, about 0.25 mL/g, about 0.50 mL/g, about 0.75 mL/g, about 1.0 mL/g, about 1.25 mL/g, about 1.50 mL/g, about 1.75 mL/g, about 2.0 mL/g, or any range between any of these pore volumes.

Aspect 62. The process according to any of Aspects 47-61, wherein the zeolite of the zeolite-based catalyst is characterized by a pore diameter of from about 3.0 Å to about 10 Å, from about 4.0 Å to about 9.0 Å, from about 5.0 Å to about 8.0 Å, or from about 5.5 Å to about 7.0 Å.

Aspect 63. The process according to any of Aspects 47-61, wherein the zeolite of the zeolite-based catalyst is characterized by a pore diameter of from about 7 Å to about 10 Å, from about 5 Å to about 6 Å, or from about 2 Å to about 3 Å.

Aspect 64. The process according to any of Aspects 47-63, wherein the zeolite-based catalyst is characterized by a surface area of about 100 $m^2/g$, about 200 $m^2/g$, about 300 $m^2/g$, about 400 $m^2/g$, about 500 $m^2/g$, about 600 $m^2/g$, about 700 $m^2/g$, about 800 $m^2/g$, about 900 $m^2/g$, about 1,000 $m^2/g$, or any range between any of these surface areas.

Aspect 65. The process according to any of Aspects 47-64, wherein the zeolite-based catalyst is in particulate form having an average particle size of from about 2 μm to about 300 μm, from about 3 μm to about 200 μm, from about 4 μm to about 100 μm, or from about 5 μm to about 25 μm.

Aspect 66. The process according to any of the preceding Aspects, wherein the first depolymerization catalyst or the second depolymerization catalyst comprise, independently, Y-zeolite and is in particulate form having an average particle size of from about 3 μm to about 8 μm.

Aspect 67. The process according to any of the preceding Aspects, wherein the first depolymerization catalyst or the second depolymerization catalyst comprise, independently, ZSM-5 (MFI) and is in particulate form having an average particle size of from about 5 μm to about 10 μm.

Aspect 68. The process according to any of the preceding Aspects, wherein the first depolymerization catalyst or the second depolymerization catalyst comprise, independently, H-MOR and is in particulate form having an average particle size of from about 12 μm to about 18 μm.

Aspect 69. The process according to any of the preceding Aspects, wherein the first depolymerization catalyst or the second depolymerization catalyst comprise, independently, beta Zeolite and is in particulate form having an average particle size of from about 3 μm to about 5 μm.

Aspect 70. The process according to any of the preceding Aspects, further comprising contacting the process feed under depolymerization conditions with a non-zeolite cracking catalyst.

Aspect 71. The process according to any of the preceding Aspects, further comprising contacting the process feed with the first depolymerization catalyst or contacting the second effluent and the second depolymerization catalyst in the third heating zone with a non-zeolite cracking catalyst comprising or selected from clays, acid treated clays, perovskites, layered titanates, silica alumina, silica-coated alumina, acidic alumina, tungstated zirconia, activated carbon, natural kaolin, acid-modified kaolin, bentonite, or any combination thereof.

Aspect 72. The process according to any of the preceding Aspects, wherein the first depolymerization catalyst or the second depolymerization catalyst comprise, independently, a chromia catalyst.

Aspect 73. The process according to Aspect 72, wherein the chromia-based catalyst comprises amorphous $Cr_2O_3$ or crystalline $Cr_2O_3$.

Aspect 74. The process according to any of Aspects 72-73, wherein the chromia-based catalyst supported on silica, silica-alumina, silica-coated alumina, silica-titania, silica-magnesia, alumina, zirconia, thoria, mixed oxides thereof, or mixtures thereof.

Aspect 75. The process according to any of Aspects 72-74, wherein the chromia-based catalyst comprises: chromia-alumina; chromia-magnesia-alumina; magnesium chromite-tin oxide; magnesium chromite-alumina-tin oxide; magnesium chromite combined with a promoter selected from B, Si, Sn, Pb, Zn, or Se; or any combination thereof.

Aspect 76. The process according to Aspect 75, wherein the promoter is present from 0.1 wt. % to 10 wt. % relative to the combined chromia (on a $Cr_2O_3$ basis) and the promoter.

Aspect 77. The process according to any of the preceding Aspects, wherein the metathesis catalyst comprises an olefin metathesis catalyst, an alkane metathesis catalyst, or a combination thereof.

Aspect 78. The process according to any of the preceding Aspects, wherein the metathesis catalyst comprises a metal oxide-based metathesis catalyst, a metal halide-based metathesis catalyst, or any combination thereof.

Aspect 79. The process according to any of the preceding Aspects, wherein the metathesis catalyst comprises cobalt oxide, molybdenum oxide, tungsten oxide, rhenium oxide, or any combination thereof.

Aspect 80. The process according to any of the preceding Aspects, wherein the metathesis catalyst comprises or further comprises a supported zirconium hydride, tantalum hydride, tungsten hydride, zirconium alkyl, tantalum alkyl, molybdenum alkyl, tungsten alkyl, tantalum alkylidene, molybdenum alkylidene, tungsten alkylidene, molybdenum alkylidyne, or tungsten alkylidyne.

Aspect 81. The process according to any of the preceding Aspects, wherein the metathesis catalyst comprises a support selected from alumina, silica, silica-alumina, silica-coated alumina, aluminum-phosphate, zirconia or any combination thereof.

Aspect 82. The process according to any of the preceding Aspects, wherein the metathesis catalyst comprises or further comprises molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof.

Aspect 83. The process according to any of the preceding Aspects, wherein the metathesis catalyst comprises or further comprises a molybdenum halide, a tungsten halide, or a combination thereof, wherein the halide is chloride, bromide, or iodide.

Aspect 84. The process according to any of the preceding Aspects, wherein the metathesis catalyst further comprises a metal alkyl activator.

Aspect 85. The process according to any of the preceding Aspects, wherein the metathesis catalyst further comprises a metal alkyl activator comprising LiR, $MgR_2$, $AlR_3$, $AlR_2X$, $AlRX_2$, $SnR_4$, or combinations thereof, wherein R is independently a $C_1$-$C_{12}$ alkyl group, a $C_1$-$C_8$ alkyl group, or a $C_1$-$C_5$ alkyl group, and X is chloride, bromide, or iodide.

Aspect 86. The process according to any of the preceding Aspects, wherein the metathesis catalyst further comprises a metal alkyl activator selected from trimethylaluminum, triethylaluminum, triisobutylaluminum, ethylaluminum dichloride, diethylaluminum chloride, ethylaluminum sesquichloride, tetramethyl tin, tetraethyl tin, or tetrabutyl tin.

Aspect 87. The process according to any of Aspects 83-86, wherein the metathesis catalyst comprises or further comprises an activator selected from oxygen, an alcohol activator, or a combination thereof.

Aspect 88. The process according to any of Aspects 83-87, wherein the metathesis catalyst comprises or further comprises an alcohol activator selected from methanol, ethanol, n-propanol, i-propanol, n-butanol, t-butanol, or sec-butanol.

Aspect 89. The process according to any of the preceding Aspects, wherein the metathesis catalyst comprises or further comprises tungsten chloride/tetrabutyl tin ($WCl_6$/$SnMe_4$), tungsten chloride/ethylaluminum dichloride ($WCl_6$/$EtAlCl_2$), tungsten chloride/ethylaluminum dichloride/ethyl alcohol ($WCl_6$/$EtAlCl_2$/EtOH), molybdenum chloride/triethyl aluminum ($MoCl_5$/$AlEt_3$), and molybdenum chloride/triethyl aluminum/oxygen ($MoCl_5$/$AlEt_3$/$O_2$).

Aspect 90. The process according to any of the preceding Aspects, further comprising contacting the polyolefin waste feed or the process feed in the first heating zone or in a pre-heating zone with a chemically-modified solid oxide comprising a solid oxide treated with an electron-withdrawing anion, in the presence or the absence of the light hydrocarbon co-feed.

Aspect 91. The process according to any of the preceding Aspects, further comprising heating the polyolefin waste feed or the process feed in the first heating zone or in a pre-heating zone in the presence of a chemically-modified solid oxide comprising a solid oxide treated with an electron-withdrawing anion, in the presence or the absence of the light hydrocarbon co-feed.

Aspect 92. The process according to any of the preceding Aspects, further comprising contacting the first effluent, the second effluent, or both the first effluent and the second effluent in the second heating zone or optionally, in the third heating zone, with an independently selected chemically-modified solid oxide, each comprising a solid oxide treated with an electron-withdrawing anion.

Aspect 93. The process according to any of the preceding Aspects, further comprising heating the first effluent, the second effluent, or both the first effluent and the second effluent in the second heating zone or optionally, in the third heating zone, in the presence of an independently selected chemically-modified solid oxide, each comprising a solid oxide treated with an electron-withdrawing anion.

Aspect 94. The process according to any of the preceding Aspects, wherein the zeolite-based catalyst further comprises a chemically-modified solid oxide, comprising a solid oxide treated with an electron-withdrawing anion.

Aspect 95. The process according to any of Aspects 90-94, wherein the chemically-modified solid oxide is generated by treatment of a solid oxide with an acid of an electron-withdrawing anion or a salt of an electron-withdrawing anion.

Aspect 96. The process according to Aspect 95, wherein following treatment of the solid oxide with the acid or the salt of an electron-withdrawing anion, the chemically-modified solid oxide is dried and calcined.

Aspect 97. The process according to any of Aspects 90-96, wherein the solid oxide of the chemically-modified solid oxide comprises $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $Ce_2O_3$, mixtures thereof, mixed oxides thereof (for example, silica-alumina), and any combinations thereof.

Aspect 98. The process according to any of Aspects 90-96, wherein the solid oxide of the chemically-modified solid oxide comprises silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, or any combination thereof.

Aspect 99. The process according to any of Aspects 90-98, wherein the electron-withdrawing anion of the chemically-modified solid oxide comprises sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, fluoride, chloride, or any combination thereof.

Aspect 100. The process according to any of Aspects 90-99, wherein the chemically-modified solid oxide is generated by treatment of a solid oxide with sulfuric acid, sulfate ion, bisulfate ion, fluoro sulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof.

Aspect 101. The process according to any of Aspects 90-100, wherein the chemically-modified solid oxide comprises a sulfur oxoacid anion-modified solid oxide, a phosphorus oxoacid anion-modified solid oxide, or a halide ion-modified solid oxide.

Aspect 102. The process according to any of Aspects 90-101, wherein the chemically-modified solid oxide comprises a sulfated solid oxide, bisulfated (hydrogen sulfated) solid oxide, fluorosulfated solid oxide, phosphated solid oxide, fluorophosphated solid oxide, fluorided solid oxide, or chlorided solid oxide.

Aspect 103. The process according to any of Aspects 90-102, wherein: the solid oxide of the chemically-modified solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion of the chemically-modified solid oxide comprises sulfate, bisulfate, fluorosulfate, phosphate, fluorophosphates, fluoride, or chloride.

Aspect 104. The process according to any of Aspects 90-103, wherein the chemically-modified solid oxide comprises sulfated alumina, sulfated silica-alumina, or sulfated silica-coated alumina.

Aspect 105. The process according to any of Aspects 90-104, wherein the chemically-modified solid oxide is metal-treated with a metal cation selected from a Group 1, 2, 12, or 13 metal.

Aspect 106. The process according to any of the preceding Aspects, wherein the polyolefin waste feed or the process feed are pre-heated in a pre-heating zone to a temperature that is from 10° F. to 40° F. below (from 5.6° C. to 22° C. below) the boiling temperature of the light hydrocarbon co-feed, or to a temperature that is from 15° F. (8° C.) to 50° F. (28° C.) below the boiling temperature of the hydrocarbon co-feed, prior to being provided to the first heating zone.

Aspect 107. The process according to any of the preceding Aspects, wherein the polyolefin waste feed or the process feed are pre-heated in a pre-heating zone to a temperature of from about 150° F. (66° C.) to about 350° F. (177° C.), from about 170° F. (77° C.) to about 300° F. (149° C.), or from about 190° F. (88° C.) to about 280° F. (138° C.) prior to being provided to the first heating zone.

Aspect 108. The process according to any of the preceding Aspects, wherein the polyolefin waste feed or the process feed are pre-heated in a pre-heating zone to a temperature of about 150° F. (66° C.), about 160° F. (71° C.), about 170° F. (77° C.), about 180° F. (82° C.), about 190° F. (88° C.), about 200° F. (93° C.), about 210° F. (99° C.), about 220° F. (104° C.), about 230° F. (110° C.), about 240° F. (116° C.), about 250° F. (121° C.), about 260° F. (127° C.), about 270° F. (132° C.), about 280° F. (138° C.), about 290° F. (143° C.), about 300° F. (149° C.), about 310° F. (154° C.), about 320° F. (160° C.), about 330° F. (166° C.), about 340° F. (171° C.), or about 350° F. (177° C.), or any range between any of these temperatures, prior to being provided to the first heating zone.

Aspect 109. The process according to any of the preceding Aspects, wherein the depolymerization conditions comprise heating the process feed and the first depolymerization catalyst in the first heating zone or heating the second effluent and the second depolymerization catalyst in the third heating zone.

Aspect 110. The process according to any of the preceding Aspects, wherein the depolymerization conditions comprise heating the process feed and the first depolymerization catalyst in the first heating zone to a temperature of from 300° F. (149° C.) to 1,000° F. (538° C.), from 400° F. (204° C.) to 900° F. (482° C.), or from 450° F. (232° C.) to 800° F. (427° C.).

Aspect 111. The process according to any of the preceding Aspects, wherein the depolymerization conditions comprise heating the process feed and the first depolymerization catalyst in the first heating zone or heating the second effluent and the second depolymerization catalyst in the third heating zone to a temperature of about 300° F. (149° C.), about 350° F. (177° C.), about 400° F. (204° C.), about 450° F. (232° C.), about 500° F. (260° C.), about 550° F. (288° C.), about 600° F. (316° C.), about 650° F. (343° C.), about 700° F. (371° C.), about 750° F. (399° C.), about 800° F. (427° C.), about 850° F. (454° C.), about 900° F. (482° C.), about 950° F. (510° C.), about 1000° F. (538° C.), or any range between any of these temperatures, while contacting the process feed and the zeolite-based catalyst.

Aspect 112. The process according to any of the preceding Aspects, wherein the depolymerization conditions comprise heating the process feed and the first depolymerization catalyst in the first heating zone or heating the second effluent and the second depolymerization catalyst in the third heating zone in the presence of hydrogen or in the absence of hydrogen.

Aspect 113. The process according to any of the preceding Aspects, wherein the depolymerization conditions comprise heating the process feed and the process feed and the first depolymerization catalyst in the first heating zone or heating the second effluent and the second depolymerization catalyst in the third heating zone in the presence of hydrogen at a pressure of from about 5 psig (34 kPa) to about 1,000 psig (6895 kPa), from about 50 psig (335 kPa) to about 800 psig (5516 kPa), or from about 100 psig (689 kPa) to about 650 psig (4482 kPa).

Aspect 114. The process according to any of the preceding Aspects, wherein the depolymerization conditions comprise heating the process feed and the first depolymerization catalyst in the first heating zone or heating the second effluent and the second depolymerization catalyst in the third heating zone in the presence of hydrogen at a pressure of about 5 psig (34 kPa), about 25 psig (172 kPa), about 50 psig (335 kPa), about 100 psig (689 kPa), about 150 psig (1034 kPa), about 200 psig (1379 kPa), about 250 psig (1724 kPa), about 300 psig (2068 kPa), about 350 psig (2413 kPa), about 400 psig (2758 kPa), about 450 psig (3103 kPa), about 500 psig (3447 kPa), about 550 psig (3792 kPa), about 600 psig (4137 kPa), about 650 psig (4482 kPa), about 700 psig (4826 kPa), about 750 psig (5171 kPa), about 800 psig (5516 kPa), about 850 psig (5861 kPa), about 900 psig (6205 kPa), about 950 psig (6550 kPa), about 1000 psig (6895 kPa), or any range between any of these pressures.

Aspect 115. The process according to any of Aspects 1-112, wherein depolymerization conditions comprise heating the process feed and the zeolite-based catalyst in the second heating zone in the absence of hydrogen.

Aspect 116. The process according to any of the preceding Aspects, wherein the halogen concentration in the process feed is reduced prior to being provided to the first heating zone.

Aspect 117. The process according to any of the preceding Aspects, wherein the halogen concentration in the polyolefin waste feed, the light hydrocarbon co-feed, or both the polyolefin waste feed and the light hydrocarbon co-feed are reduced prior to being provided to the first heating zone.

Aspect 118. The process according to any of the preceding Aspects, wherein the chlorine concentration or the fluorine concentration by weight in the process feed are, independently, less than 100 ppm, less than 90 ppm, less than 80 ppm, less than 70 ppm, less than 60 ppm, less than 50 ppm, less than 40 ppm, less than 30 ppm, less than 20 ppm, less than 10 ppm, or less than 5 ppm prior to being provided to the first heating zone.

Aspect 119. The process according to any of the preceding Aspects, wherein the metathesis conditions comprise heating the first effluent and the metathesis catalyst in the second heating zone.

Aspect 120. The process according to any of the preceding Aspects, wherein the metathesis conditions comprise heating the first effluent and the metathesis catalyst in the second heating zone to a temperature of from 300° F. (149° C.) to 1,000° F. (538° C.), from 400° F. (204° C.) to 900° F. (482° C.), or from 450° F. (232° C.) to 800° F. (427° C.) while contacting the first effluent with the metathesis catalyst.

Aspect 121. The process according to any of the preceding Aspects, wherein the metathesis conditions comprise heating the first effluent and the metathesis catalyst in the second heating zone in the presence of hydrogen or in the absence of hydrogen.

Aspect 122. The process according to any of the preceding Aspects, wherein the metathesis conditions comprise heating the first effluent and the metathesis catalyst in the second heating zone in the presence of hydrogen at a pressure of from about 5 psig (34 kPa) to about 1,000 psig (6895 kPa), from about 50 psig (335 kPa) to about 800 psig (5516 kPa), or from about 100 psig (689 kPa) to about 650 psig (4482 kPa).

Aspect 123. The process according to any of the preceding Aspects, wherein the metathesis conditions comprise heating the first effluent and the metathesis catalyst in the second heating zone in the presence of hydrogen at a pressure of about 5 psig (34 kPa), about 25 psig (172 kPa), about 50 psig (335 kPa), about 100 psig (689 kPa), about 150 psig (1034 kPa), about 200 psig (1379 kPa), about 250 psig (1724 kPa), about 300 psig (2068 kPa), about 350 psig (2413 kPa), about 400 psig (2758 kPa), about 450 psig (3103 kPa), about 500 psig (3447 kPa), about 550 psig (3792 kPa), about 600 psig (4137 kPa), about 650 psig (4482 kPa), about 700 psig (4826 kPa), about 750 psig (5171 kPa), about 800 psig (5516 kPa), about 850 psig (5861 kPa), about 900 psig (6205 kPa), about 950 psig (6550 kPa), about 1000 psig (6895 kPa), or any range between any of these pressures.

Aspect 124. The process according to any of the preceding Aspects, wherein one or more output streams comprises halogenated hydrocarbons in a first concentration, and further comprising contacting the one or more output streams with a dehydrohalogenation catalyst to reduce the first concentration of halogenated hydrocarbons to a second concentration.

Aspect 125. The process according to Aspect 124, wherein the dehydrohalogenation catalyst comprises a Group 4-13 metal supported on a metal oxide or aluminosilicate support.

Aspect 126. The process according to any of Aspects 124-125, wherein the dehydrohalogenation catalyst comprises chromium, molybdenum, tungsten, iron, ruthenium, osmium, cobalt, rhodium, iridium, nickel, palladium, platinum, zinc, magnesium, gallium, titanium, tantalum, or any combination thereof, supported on alumina, silica, silica-alumina, silica-coated alumina, titania, zirconia, a zeolite, a molecular sieve, aluminophosphate, or a combination thereof.

Aspect 127. The process according to any of the preceding Aspects, wherein the plurality of output streams comprise a light hydrocarbon stream, a medium hydrocarbon stream, a heavy hydrocarbon stream, or any combination thereof.

Aspect 128. The process according to any of the preceding Aspects, wherein one of the plurality of output streams comprises $C_2$-$C_5$ hydrocarbons.

Aspect 129. The process according to any of the preceding Aspects, wherein one of the plurality of output streams comprises $C_6$-$C_8$ hydrocarbons.

Aspect 130. The process according to any of the preceding Aspects, wherein one of the plurality of output streams comprises $C_{9+}$ hydrocarbons.

Aspect 131. The process according to any of the preceding Aspects, wherein one output stream comprises $C_2$-$C_5$ hydrocarbons and halogenated hydrocarbons, and further comprising dehalogenation of the halogenated hydrocarbons.

Aspect 132. The process according to any of the preceding Aspects, wherein one output stream comprises $C_6$-$C_8$ hydrocarbons and halogenated hydrocarbons, and further comprising dehalogenation of the halogenated hydrocarbons.

Aspect 133. The process according to any of the preceding Aspects, wherein one output stream comprises $C_2$-$C_5$ hydrocarbons, and further comprising providing the $C_2$-$C_5$ hydrocarbons to a steam cracker to produce a stream cracker effluent comprising circular ethylene and/or circular propylene.

Aspect 134. The process according to any of the preceding Aspects, wherein one output stream comprises $C_6$-$C_8$ hydrocarbons, and further comprising providing the $C_6$-$C_8$ hydrocarbons to a reforming unit or an AROMAX® unit to produce one or more circular aromatic products.

Aspect 135. The process according to any of the preceding Aspects, wherein one output stream comprises $C_6$-$C_8$ hydrocarbons, and further comprising providing the $C_6$-$C_8$ hydrocarbons to a steam cracker to produce a stream cracker effluent comprising circular ethylene and/or circular propylene.

Aspect 136. A system for converting plastic waste, the system comprising: (*a*) a first heating zone configured to receive a process feed through a first feed inlet, heat the process feed in the presence of a first depolymerization catalyst, and discharge a first effluent through at least one first product outlet;

(b) a second heating zone configured to receive at least a portion of the first effluent through a second feed inlet, heat the first effluent in the presence of a metathesis catalyst, and discharge a second effluent through at least one second product outlet;

(c) an optional third heating zone configured to receive the second effluent through a third feed inlet, heat the second effluent in the presence of a second depolymerization catalyst, and discharge a third effluent through at least one third product outlet; and (d) a separation unit, configured to receive and separate the second effluent or the third effluent into a plurality of output streams, each output stream comprising a circular product.

Aspect 137. The system according to Aspect 136, wherein the optional third heating zone is present.

Aspect 138. The system according to Aspect 136, wherein the optional third heating zone is absent.

Aspect 139. The system according to any of Aspects 136-138, wherein the first heating zone and the second heating zone occur in a single reactor.

Aspect 140. The system according to any of Aspects 136-138, wherein the first heating zone and the second heating zone occur in separate reactors in series.

Aspect 141. The system according to any of Aspects 136-137, wherein the first heating zone, the second heating zone, and the third heating zone occur in a single reactor.

Aspect 142. The system according to any of Aspects 136-137, wherein the first heating zone, the second heating zone, and the third heating zone occur in separate reactors in series.

Aspect 143. The system according to any of Aspects 136-142, further comprising a pre-heating zone configured to pre-heat the process feed or a component thereof and feed the pre-heated process feed or the component thereof to the first heating zone through the first feed inlet.

Aspect 144. The system according to Aspect 143, wherein the pre-heating zone comprises an extruder.

Aspect 145. The system according to any of Aspects 136-144, wherein the first heating zone, the second heating zone, and if applicable, the third heating zone, or any combination thereof comprises a fluidized bed reactor.

Aspect 146. The system according to any of Aspects 136-145, wherein the first heating zone, the second heating zone, and if applicable, the third heating zone, or any combination thereof comprises a fixed bed reactor.

Aspect 147. The system according to any of Aspects 136-146, further comprising a recycle line configured to recycle one of the output streams from the separation unit to the first heating zone.

Aspect 148. The system according to any of Aspects 136-147, wherein the first heating zone further comprising an auxiliary feed inlet configured to receive a light hydrocarbon co-feed.

Aspect 149. The system according to any of Aspects 136-148, wherein the at least one first product outlet of the first heating zone comprises a gaseous effluent outlet and a liquid effluent outlet.

Aspect 150. The system according to any of Aspects 136-149, wherein the at least one second product outlet of the second heating zone comprises a gaseous effluent outlet and a liquid effluent outlet.

Aspect 151. The system according to any of Aspects 136-150, wherein the at least one third product outlet of the third heating zone comprises a gaseous effluent outlet and a liquid effluent outlet.

Aspect 152. The system according to any of Aspects 136-151, wherein the separation unit comprises one or more condensers downstream of the second heating zone or the third heating zone configured to separate the second effluent or the third effluent into the plurality of output streams.

Aspect 153. The system according to any of Aspects 136-152, wherein the separation unit is configured to separate the second effluent or the third effluent into a light hydrocarbon stream comprising $C_2$-$C_5$ hydrocarbons, a medium hydrocarbon stream comprising $C_6$-$C_8$ hydrocarbons, and a heavy hydrocarbon stream comprising $C_9$+ hydrocarbons.

Aspect 154. The system according to any of Aspects 136-153, wherein the separation unit is configured to provide a $C_2$-$C_5$ hydrocarbon stream, the system further comprising a steam cracker configured to receive the $C_2$-$C_5$ hydrocarbon stream and produce a stream cracker effluent comprising circular ethylene and/or circular propylene.

Aspect 155. The system according to any of Aspects 136-154, wherein the separation unit is configured to provide a $C_6$-$C_8$ hydrocarbon stream, the system further comprising a steam cracker configured to receive the $C_6$-$C_8$ hydrocarbon stream and produce a stream cracker effluent comprising circular ethylene and/or circular propylene.

Aspect 156. The system according to any of Aspects 136-155, wherein the separation unit is configured to provide a $C_6$-$C_8$ hydrocarbon stream, the system further comprising an AROMAX® unit or a reforming unit configured to receive the $C_6$-$C_8$ hydrocarbon stream and produce one or more circular aromatic products.

Aspect 157. The system according to any of Aspects 136-156, wherein the separation unit is configured to provide a $C_{9+}$ hydrocarbon stream, the system further comprising a fluid catalytic cracker (FCC) configured to receive the $C_{9+}$ stream and produce an FCC effluent comprising circular naphtha ($C_6$-$C_{10}$ hydrocarbons) and circular $C_5$ and lighter ($C_{5-}$) hydrocarbons.

Aspect 158. The system according to any of Aspects 136-157, wherein the system further comprises a pretreater between the separation unit and the fluid catalytic cracker (FCC) configured to receive the $C_{9+}$ stream and form a treated $C_{9+}$ stream having a lower sulfur, halogen, or aromatic content as compared with the $C_{9+}$ stream prior to pretreating.

Aspect 159. The system according to any of Aspects 136-158, wherein the separation unit is configured to provide a heavy hydrocarbon stream, the system further comprising a recycle pump and recycle line from the separation unit to the first depolymerization reactor to return at least a portion of the heavy hydrocarbon stream from the separation unit to the first depolymerization reactor.

Aspect 160. The system according to any of Aspects 136-159, the system further comprising a dehydrohalogenation unit downstream of the separation unit configured to receive any one of the plurality of output streams and reduce the halogen concentration therein.

Variations of the disclosed subject matter which may suggest themselves to those skilled in the art in light of these aspects and embodiments, and the specific examples and detailed description are within the full intended scope of the appended claims.

We claim:

1. A process for converting plastic waste, the process comprising:

(a) providing a process feed comprising a polyolefin waste feed and a light hydrocarbon co-feed to a first heating zone;

(b) heating the process feed in the presence of a first depolymerization catalyst under depolymerization conditions to form a first effluent;

(c) providing the first effluent to a second heating zone;

(d) heating the first effluent in the presence of a metathesis catalyst under metathesis conditions to form a second effluent; and (e)(1) separating at least a portion of the second effluent into a plurality of output streams, each output stream comprising a circular product, (2)(A) providing at least a portion of the second effluent to a third heating zone and heating the second product feed in the presence of a second depolymerization catalyst under depolymerization conditions to form a third effluent, and (B) separating the third effluent into a plurality of output streams, each output stream comprising a circular product, or (3) conducting steps (e)(1), (e)(2) (A), and (e)(2)(B).

2. The process according to claim 1, wherein the polyolefin waste feed, the light hydrocarbon co-feed, or both the polyolefin waste feed and the light hydrocarbon co-feed, are pre-heated prior to being provided to the first heating zone.

3. The process according to claim 1, wherein the polyolefin waste feed is preheated in a pre-heating zone in the presence of the first depolymerization catalyst prior to being provided to the first heating zone.

4. The process according to claim 1, wherein the first effluent and the second effluent comprise, independently, a light fraction which is removed from the first heating zone, and the light fraction comprises $C_3$ and lighter hydrocarbons, $C_4$ and lighter hydrocarbons, or $C_5$ and lighter hydrocarbons.

5. The process according to claim 1, wherein at least a portion of one of the output streams is recycled to the first heating zone.

6. The process according to claim 1, wherein an amount or a fraction of the circular product attributable to the polyolefin waste feed in one or more output streams is determined by mass balance.

7. The process according to claim 1, wherein the process further comprises certifying the circular product attributable to the polyolefin waste feed in one or more output streams as Circular in accordance with International Sustainability and Carbon Certification (ISCC) standards, based upon an amount or a fraction of the circular product attributable to the polyolefin waste feed in one or more output streams determined by mass balance and a free attribution method.

8. The process according to claim 1, wherein the polyolefin waste feed comprises polyethylene, polypropylene, polystyrene, or any combination thereof.

9. The process according to claim 1, wherein the polyolefin waste feed comprises a catalyst residual in the polyolefin waste comprising:

(a) an oxide of a Group 4 metal, a Group 5 metal, a Group 6 metal, a Group 7 metal, or any combination thereof;

(b) silica, alumina, silica-alumina, magnesium oxide, or any combination thereof; or (c) a chemically-modified solid oxide comprising a solid oxide treated with an electron-withdrawing anion.

10. The process according to claim 1, wherein the polyolefin waste feed is present in the process feed in a concentration of from 15 wt. % to 80 wt. %.

11. The process according to claim 1, wherein the process feed comprises an additional plastic waste feed other than the polyolefin waste feed, and the additional plastic waste feed comprises polyester, polyamide, polyurethane, polyphenol, polycarbonate, polyvinyl halide, or any combination thereof.

12. The process according to claim 1, wherein the process feed comprises an additional plastic waste feed other than the polyolefin waste feed, and the additional plastic waste feed comprises polyethylene terephthalate (PET) or polyvinyl chloride (PVC).

13. The process according to claim 1, wherein the polyolefin waste feed is a solid characterized by an average particle size of from 2 mm to 20 mm.

14. The process according to claim 1, wherein the light hydrocarbon co-feed comprises a pyrolysis gas or liquid, a pyrolysis oil fraction, a petroleum-based co-feed, a fossil fuel-based co-feed, or a bio-based co-feed, or any combination thereof.

15. The process according to claim 1, wherein the light hydrocarbon co-feed comprises a light ($C_2$-$C_5$) hydrocarbon, a light ($C_6$ or lower) pyrolysis liquid, a $C_5$-$C_6$ saturated hydrocarbon, natural gas liquids (NGL), light naphtha, or any combination thereof.

16. The process according to claim 1, wherein the first depolymerization catalyst or the second depolymerization catalyst comprise, independently, a zeolite-based catalyst, a chromia-based catalyst, or a combination thereof.

17. The process according to claim 16, wherein the zeolite-based catalyst comprises L-Zeolite (Zeolite L or LTL), X-Zeolite (Zeolite X), Y-Zeolite (Zeolite Y), omega Zeolite, beta Zeolite, SAPO-34 Zeolite, USY Zeolite, HY Zeolite, ZSM-4, ZSM-5 (MFI), ZSM-10, ZSM-11, ZSM-12, ZSM-20, ZSM-22, ZSM-23, ZSM-34, ZSM-35, ZSM-50, REY, USY, RE-USY, LZ-210, LZ-210-A, LZ-210-M, LZ-210-T, SSZ-13, SSZ-24, SSZ-26, SSZ-31, SSZ-33, SSZ-35, SSZ-37, SSZ-41, SSZ-42, SSZ-44, MCM-58, H-MOR (H-mordenite), mazzite, faujasite, chabazite, a modified mesoporous form thereof, or any combination thereof.

18. The process according to claim 16, wherein the zeolite-based catalyst comprises chromium, molybdenum, tungsten, iron, ruthenium, osmium, cobalt, rhodium, iridium, nickel, palladium, platinum, zinc, magnesium, gallium, titanium, tantalum, or any combination thereof.

19. The process according to claim 16, wherein the zeolite-based catalyst comprises Pt-L-Zeolite, Pt-ZSM-5, Pt-Y zeolite, Pt-SAPO-34 zeolite, Pt-SSZ-13 zeolite, Pt-USY zeolite, Pt-HY zeolite, Pt-beta zeolite, or any combination thereof.

20. The process according to claim 16, wherein the zeolite-based catalyst comprises a chloride concentration of from about 0.1 wt. % to about 4.0 wt. % and a fluoride concentration of from about 0.1 wt. % to about 5.0 wt. % relative to the weight of the zeolite-based catalyst prior to reduction.

21. The process according to claim 16, wherein the zeolite-based catalyst comprises a promoter selected from a Group 1, 2, 14 or 15 metal.

22. The process according to claim 16, wherein the zeolite-based catalyst is characterized by:

(a) a pore volume of the zeolite of from about 0.10 mL/g to about 2.0 mL/g;

(b) a pore diameter of the zeolite of from about 3.0 Å to about 10 Å; and (c) a zeolite-based catalyst surface area of from about 100 $m^2/g$ to about 1,000 $m^2/g$.

23. The process according to claim 16, wherein the zeolite-based catalyst is in particulate form having an average particle size of from about 2 μm to about 300 μm.

24. The process according to claim 16, wherein the chromia-based catalyst comprises amorphous $Cr_2O_3$ or crystalline $Cr_2O_3$ supported on silica, silica-alumina, silica-coated alumina, silica-titania, silica-magnesia, alumina, zirconia, thoria, mixed oxides thereof, or mixtures thereof.

25. The process according to claim 16, wherein the chromia-based catalyst comprises: chromia-alumina; chromia-magnesia-alumina; magnesium chromite-tin oxide; magnesium chromite-alumina-tin oxide; magnesium chromite combined with a promoter selected from B, Si, Sn, Pb, Zn, or Se; or any combination thereof.

26. The process according to claim 1, wherein the metathesis catalyst comprises an olefin metathesis catalyst, an alkane metathesis catalyst, or a combination thereof.

27. The process according to claim 1, wherein the metathesis catalyst comprises:

(a) cobalt oxide, molybdenum oxide, tungsten oxide, rhenium oxide, or any combination thereof;

(b) a molybdenum halide, a tungsten halide, or a combination thereof, wherein the halide is chloride, bromide, or iodide; or (c) a zirconium hydride, tantalum hydride, tungsten hydride, zirconium alkyl, tantalum alkyl, molybdenum alkyl, tungsten alkyl, tantalum alkylidene, molybdenum alkylidene, tungsten alkylidene, molybdenum alkylidyne, or tungsten alkylidyne;

wherein the metathesis catalyst further comprises a support selected from alumina, silica, silica-alumina, silica-coated alumina, aluminum-phosphate, zirconia or any combination thereof.

28. The process according to claim 1, wherein the metathesis catalyst comprises:

(a) molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof; or (b) tungsten chloride/tetrabutyl tin ($WCl_6/SnMe_4$), tungsten chloride/ethylaluminum dichloride ($WCl_6/EtAlCl_2$), tungsten chloride/ethylaluminum dichloride/ethyl alcohol ($WCl_6/EtAlCl_2/EtOH$), molybdenum chloride/triethyl aluminum ($MoCl_5/AlEt_3$), and molybdenum chloride/triethyl aluminum/oxygen ($MoCl_5/AlEt_3/O_2$).

29. The process according to claim 1, wherein the metathesis catalyst further comprises an activator selected from a metal alkyl activator, oxygen, or an alcohol activator.

30. The process according to claim 1, further comprising heating the polyolefin waste feed or the process feed in the first heating zone or in a pre-heating zone in the presence of a chemically-modified solid oxide comprising a solid oxide treated with an electron-withdrawing anion, in the presence or the absence of the light hydrocarbon co-feed.

31. The process for according to claim 30, wherein the solid oxide of the chemically-modified solid oxide comprises silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, or any combination thereof.

32. The process for according to claim 30, wherein the solid oxide of the chemically-modified solid oxide is treated with an electron-withdrawing anion comprising sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, fluoride, chloride, or any combination thereof.

33. The process for converting plastic waste according to claim 30, wherein:

the solid oxide of the chemically-modified solid oxide is selected from silica, alumina, silica-alumina, silica-coated alumina, aluminum phosphate, aluminophosphate, heteropolytungstate, titania, zirconia, magnesia, boria, zinc oxide, a mixed oxide thereof, or any combination thereof; and the solid oxide is treated with an electron-withdrawing anion selected from sulfate, bisulfate, fluorosulfate, phosphate, fluorophosphates, fluoride, or chloride.

34. The process for converting plastic waste according to claim 30, wherein the chemically-modified solid oxide comprises sulfated alumina, sulfated silica-alumina, or sulfated silica-coated alumina.

35. The process for converting plastic waste according to claim 30, wherein the chemically-modified solid oxide is metal-treated with a metal cation selected from a Group 1, 2, 12, or 13 metal.

36. The process for converting plastic waste according to claim 1, wherein the plurality of output streams comprise a light ($C_2$-$C_5$) hydrocarbon stream, a medium ($C_6$-$C_8$) hydrocarbon stream, a heavy ($C_{9+}$) hydrocarbon stream, or any combination thereof.

37. The process according to claim 1, wherein the polyolefin waste feed or the process feed are pre-heated in a pre-heating zone to a temperature that is from 10° F. to 40° F. below (from 5.6° C. to 22° C. below) the boiling temperature of the light hydrocarbon co-feed, or to a temperature that is from 15° F. (8° C.) to 50° F. (28° C.) below the boiling temperature of the hydrocarbon co-feed, prior to being provided to the first heating zone.

38. The process according to claim 1, wherein the depolymerization conditions comprise heating the process feed and the first depolymerization catalyst in the first heating zone or heating the at least a portion of the second effluent and the second depolymerization catalyst in the third heating zone to a temperature of from 300° F. (149° C.) to 1,000° F. (538° C.), in the presence of hydrogen or in the absence of hydrogen.

39. The process according to claim 1, wherein the chlorine concentration or the fluorine concentration by weight in the process feed are, independently, less than 100 ppm by weight prior to being provided to the first heating zone.

40. The process according to claim 1, wherein the metathesis conditions comprise heating the first effluent and the metathesis catalyst in the second heating zone to a temperature of from 300° F. (149° C.) to 1,000° F. (538° C.) in the presence or absence of hydrogen.

41. The process according to claim 1, wherein one output stream comprises $C_2$-$C_5$ hydrocarbons, and further comprising providing the $C_2$-$C_5$ hydrocarbons to a steam cracker to produce a stream cracker effluent comprising circular ethylene and/or circular propylene.

42. The process according to claim 1, wherein one output stream comprises $C_6$-$C_8$ hydrocarbons, and further comprising providing the $C_6$-$C_8$ hydrocarbons to a reforming unit to produce one or more circular aromatic products.

43. The process according to claim 1, wherein one output stream comprises $C_6$-$C_8$ hydrocarbons, and further comprising providing the $C_6$-$C_8$ hydrocarbons to a steam cracker to produce a stream cracker effluent comprising circular ethylene and/or circular propylene.

* * * * *